US008143331B2

(12) United States Patent  
Raymond et al.

(10) Patent No.: US 8,143,331 B2
(45) Date of Patent: Mar. 27, 2012

(54) ALKYLATED POLYALKYLENEAMINES AND USES THEREOF

(75) Inventors: Williams René Edouard Raymond, New Tripoli, PA (US); Gamini Ananda Vedage, Bethlehem, PA (US); Stephen Francis Monaghan, Utrecht (NL); Michael Ian Cook, De Meern (NL); Susana R. Grote, Schnecksville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 735 days.

(21) Appl. No.: 11/672,298

(22) Filed: Feb. 7, 2007

(65) Prior Publication Data

US 2008/0188591 A1  Aug. 7, 2008

(51) Int. Cl.
C08L 63/00 (2006.01)
C08L 79/00 (2006.01)
C08G 59/50 (2006.01)

(52) U.S. Cl. ........ 523/404; 523/414; 523/417; 523/420; 525/526

(58) Field of Classification Search .................. None
See application file for complete search history.

(56) References Cited

U.S. PATENT DOCUMENTS

| | | | |
|---|---|---|---|
| 2,589,245 A | 3/1952 | Greenlee | |
| 3,297,519 A * | 1/1967 | Rambosek | 162/164.3 |
| 3,763,102 A | 10/1973 | Hoffmann et al. | |
| 4,197,389 A | 4/1980 | Becker et al. | |
| 4,268,656 A | 5/1981 | Ray-Chaudhuri et al. | |
| 5,032,629 A * | 7/1991 | Hansen et al. | 523/414 |
| 5,587,409 A | 12/1996 | Dreischhoff et al. | |
| 5,618,905 A * | 4/1997 | Marsella et al. | 528/123 |
| 2007/0073009 A1* | 3/2007 | Sabbadini et al. | 525/524 |
| 2008/0255271 A1* | 10/2008 | Raymond | 523/437 |

FOREIGN PATENT DOCUMENTS

| | | |
|---|---|---|
| DE | 26 51 760 A1 | 5/1977 |
| DE | 28 53 752 A1 | 10/1979 |
| DE | 215 071 (B) | 10/1984 |
| DE | 198 48 113 C2 | 8/2001 |
| EP | 0 737 702 B1 | 8/2003 |
| EP | 1 433 775 A2 | 6/2004 |
| EP | 1454935 A1 * | 9/2004 |
| EP | 1 679 329 A1 | 7/2006 |
| JP | 02239139 | 9/1990 |

OTHER PUBLICATIONS

Bernardo, M. Alexandra, et al., "Thermodynamic and Steady-State Fluorescence Emission . . . ," Inorganic Chemistry, 37(16), p. 3935-3942 (1998).
Bernardo, M. Alexandra, et al., "Thermodynamic, NMR and Photochemical Study . . . ," Journal of the Chemical Society, (11), p. 2335-2342 (1996).
Kroupa, Jan, et al., Use of H2N (CH2) 3N (R1R2)—Type Amines as Hardening Agents . . . , Chemicky Prumysl, 26(9), p. 477-480 (1976).

* cited by examiner

*Primary Examiner* — Michael J Feely
(74) *Attorney, Agent, or Firm* — Michael K. Boyer

(57) ABSTRACT

The present invention provides curing agent compositions comprising the reaction product of alkylated polyalkyleneamine compounds and polyalkylene polyether polyol modified polyepoxide resins. Amine-epoxy compositions and articles produced from these amine-epoxy compositions are also disclosed.

32 Claims, No Drawings

ALKYLATED POLYALKYLENEAMINES AND USES THEREOF

BACKGROUND OF THE INVENTION

The present invention relates generally to alkylated polyalkyleneamine compounds, curing agent and amine-epoxy compositions derived from such compounds, and articles produced from such compounds and/or compositions.

Certain epoxy resins which are cured, hardened, and/or crosslinked with amine-based curing agents are well known. These amine-epoxy materials are widely used in applications ranging from coatings, adhesives, and composites, to civil engineering applications such as formulations for concrete flooring.

Due to regulations on volatile organic compounds (VOC's), it can be beneficial to reduce or eliminate emissions from organic solvents. Thus, numerous waterborne curing agent compositions and waterborne amine-epoxy compositions have been developed over the past decade. Since no organic solvent is present in some of these aqueous amine-epoxy systems, the odor, environmental, and health risks often associated with the presence of organic solvents can be eliminated.

However, many industry problems remain with waterborne curing agent and amine-epoxy systems. For instance, coatings made from aqueous amine-epoxy compositions often have poor surface appearance, characterized in the industry by the terms blush, carbamation, and exudate. These problems, in part, are due to the incompatibility of the amine curing agent and the epoxy resin, which causes phase separation and results in amine migration to the coating surface. To address this issue, it is often necessary to modify the amine curing agent to improve compatibility, which can add cost and complexity.

In certain applications, it is desirable to formulate a waterborne curing agent to relatively low solids, for example, less than 40% solids, by dilution with water. Many aqueous curing agent compositions, unfortunately, cannot be diluted without causing phase separation of the formulation, which is evidenced by cloudiness in an otherwise clear formulation. Such phase separation is undesirable as it can lead to instability of the curing agent formulation during storage. In some cases, this problem can be addressed by diluting with water at the job site and only shortly before mixing the curing agent with the epoxy resin for use. In contrast to formulating a particular solids content in a controlled manufacturing environment, job-site formulating can lead to inconsistent blends and the introduction of contaminants, which can cause performance problems in the end-use application. Another method to improve the stability of the waterborne product is to add an acid, such as a carboxylic acid. Typically, this approach adversely affects the water and chemical resistance properties of the final cured product.

Additionally, many waterborne amine-epoxy compositions have a short pot-life, sometimes as short as 30 minutes to 2 hours. Pot life is the time available to apply a coating or film to a substrate after mixing the epoxy resin and hardener or curing agent. The end of the pot-life can be evidenced by a sharp a rise in formulation viscosity, or a detrimental change in properties such as gloss or hardness of the cured coating or film. Such reduction in properties is particularly problematic, as it is not possible to detect the problem until after the coating has been applied to a substrate and cured.

It is often found that when water-based amine-epoxy systems are applied to cementitious or concrete substrates, the water-based emulsion or dispersion is destabilized. This can result in poor appearance, reduced substrate adhesion, and decreased performance properties such as chemical resistance.

There are numerous aqueous amine-based curing agent and amine-epoxy compositions that are employed in the amine-epoxy coating industry; however, none of these known products completely addresses the needs or solves the problems noted above. Accordingly, it is to this end that the present invention is directed.

BRIEF SUMMARY OF THE INVENTION

The present invention discloses novel curing agent compositions and methods of making such compositions. These novel curing agent compositions can be used to cure, harden, and/or crosslink an epoxy resin. Curing agent compositions in accordance with the present invention comprise the reaction product of:
(a) at least one alkylated polyalkyleneamine and
(b) at least one polyalkylene polyether polyol modified polyepoxide resin.

In another aspect, the present invention provides a curing agent composition comprising the contact product of:
(i) the reaction product of:
  (a) at least one alkylated polyalkyleneamine and
  (b) at least one polyalkylene polyether polyol modified polyepoxide resin; and
(ii) at least one multifunctional amine having 2 or more active amine hydrogens.
Generally, curing agent compositions of the present invention have an amine hydrogen equivalent weight (AHEW) based on 100% solids from about 50 to about 500.

Aqueous or waterborne curing agent compositions are within the scope of the present invention. Such water-based curing agent compositions comprise the contact product of:
(i) the reaction product of:
  (a) at least one alkylated polyalkyleneamine and
  (b) at least one polyalkylene polyether polyol modified polyepoxide resin;
(ii) at least one multifunctional amine having 2 or more active amine hydrogens; and
(iii) water.

The present invention, in yet another aspect, provides amine-epoxy compositions. For example, an amine-epoxy composition in accordance with the present invention comprises the reaction product of:
A) a curing agent composition comprising the contact product of:
  (i) the reaction product of:
    (a) at least one alkylated polyalkyleneamine and
    (b) at least one polyalkylene polyether polyol modified polyepoxide resin; and
  (ii) at least one multifunctional amine having 2 or more active amine hydrogens; and
B) an epoxy composition comprising at least one multifunctional epoxy resin.

Further, in another aspect of the present invention, aqueous amine-epoxy compositions comprising the amine-epoxy composition described immediately above and water are provided. These novel waterborne amine-epoxy compositions have good stability when in contact with concrete or cementitious materials and high gloss and good hardness development when in the form of a film or coating.

Articles of manufacture produced from amine-epoxy compositions disclosed herein include, but are not limited to, adhesives, coatings, primers, sealants, curing compounds, construction products, flooring products, or composite products. Further, such coatings, primers, sealants, or curing compounds can be applied to metal or cementitious substrates.

Definitions

The following definitions and abbreviations are provided in order to aid those skilled in the art in understanding the detailed description of the present invention.

AHEW—amine hydrogen equivalent weight.
Aq100—Anquawhite® 100, water-based polyamine adduct, commercially available from Air Products and Chemicals, Inc.
Aq401—Anquamine® 401, water-based polyamine adduct, commercially available from Air Products and Chemicals, Inc.
Aq701—Anquamine® 701, water-based polyamine adduct, commercially available from Air Products and Chemicals, Inc.
DETA—diethylenetriamine.
EDA—ethylenediamine.
Epikote® 828—liquid epoxy resin with an epoxy equivalent weight of approximately 184-192, commercially available from Hexion.
N3—N-3-aminopropyl ethylenediamine.
N4—N,N'-bis(3-aminopropyl)ethylenediamine.
N5—N,N,N'-tris(3-aminopropyl)ethylenediamine.
PEHA—pentaethylenehexamine.
TEPA—teraethylenepentamine.
TETA—triethylenetetramine.

DETAILED DESCRIPTION OF THE INVENTION

Amine and Epoxy-Amine Compositions

The present invention discloses novel curing agent compositions and methods of making these curing agent compositions. A curing agent composition in accordance with the present invention can be used to cure, harden, and/or crosslink an epoxy resin. Such composition comprises the reaction product of:
(a) at least one alkylated polyalkyleneamine and
(b) at least one polyalkylene polyether polyol modified polyepoxide resin.

Generally, this curing agent composition has an amine hydrogen equivalent weight (AHEW) based on 100% solids from about 50 to about 500. In a different aspect, the curing agent composition has an AHEW based on 100% solids from about 60 to about 400, or from about 80 to about 300. Further, the curing agent composition can have an AHEW based on 100% solids from about 100 to about 200.

In another aspect, the present invention provides a curing agent composition comprising the contact product of:
(i) the reaction product of:
  (a) at least one alkylated polyalkyleneamine and
  (b) at least one polyalkylene polyether polyol modified polyepoxide resin; and
(ii) at least one multifunctional amine having 2 or more active amine hydrogens.

The curing agent composition in this aspect of the present invention can have an AHEW based on 100% solids from about 50 to about 500. Further, such curing agent composition can have an AHEW based on 100% solids in the range from about 55 to about 450, from about 60 to about 400, from about 70 to about 350, from about 80 to about 300, or from about 90 to about 250. In a different aspect, the curing agent composition has an AHEW based on 100% solids from about 100 to about 200.

The AHEW of a curing agent composition based on 100% solids is determined by the following equation:

$$AHEW = \frac{Wt.\, B + Wt.\, 2 + Wt.\, A}{[(Wt.\, B/AHEW_B) + (Wt.\, 2/AHEW_2)] - (Wt.\, A/EEW_A)};$$

wherein:

$A$ represents the polyalkylene polyether polyol modified polyepoxide resin;

$B$ represents the alkylated polyalkyleneamine compound;

$2$ represents the multifunctional amine;

$Wt.$ represents the weight based on 100% solids;

$AHEW$ represents the respective amine hydrogen equivalent weights; and $EEW_A$ represents the epoxy equivalent weight of resin $A$ and is determined by titration using $ASTM\, D1652\text{-}97$, or a similar procedure.

If the multifunctional amine is different from the alkylated polyalkyleneamine, $AHEW_2$ can be calculated based on its chemical structure, or is often provided by the supplier of the amine in case of a mixture. The AHEW for the alkylated polyalkyleneamine compound, $AHEW_B$, is determined using the following formula, assuming the polyalkyleneamine is the reductive amination product of x moles of aldehyde/ketone compound, for example, with 1 mole of a polyalkyleneamine compound, PAA (the polyalkyleneamine compound and the aldehyde/ketone compound are discussed in greater detail below):

$$AHEW_B = \frac{MW_{PAA} + x \cdot (MW_{Ald/Ket} - 16)}{f - x};$$

wherein:

$MW_{PAA}$ is the average molecular weight of the polyalkyleneamine;

$MW_{Ald/Ket}$ is the molecular weight of the aldehyde or ketone compound;

$f$ is the average amine hydrogen functionality of the polyalkyleneamine; and $MW_{APAA}$ is the average molecular weight of the alkylated polyalkyleneamine and can be calculated as follows:

$$MW_{APAA} = MW_{PAA} + x \cdot (MW_{Ald/Ket} - 16).$$

The relative amount of the reaction product of the at least one alkylated polyalkyleneamine and at least one polyalkylene polyether polyol modified polyepoxide resin versus that of the multifunctional amine can vary. This variance depends upon, for example, the end-use article, its desired properties, and the fabrication method and conditions used to produce the end-use article.

Additionally, curing agent compositions described herein can be solventless, also referred to as solvent-free or 100% solids. Alternatively, in another aspect of the present invention, these compositions can further comprise at least one diluent, such as, for example, water, an organic solvent, or an organic or inorganic acid. Appropriate organic solvents are well known to those skilled in the art of amine formulation chemistry. Exemplary organic solvents suitable for use in the present invention include, but are not limited to, benzyl alcohol, butanol, toluene, xylene, methyl ethyl ketone, and the like, or combinations thereof. Non-limiting examples of organic and inorganic acids are acetic acid, sulfamic acid, lactic acid, salicylic acid, sebacic acid, boric acid, phosphoric acid, and the like, or combinations thereof. Such acids can increase the solubility of a curing agent composition in water, for example. However, the use of acids can increase the water sensitivity of a cured amine-epoxy composition.

Aqueous or waterborne curing agent compositions are within the scope of the present invention. A water-based curing agent composition comprises the contact product of:
(i) the reaction product of:
  (a) at least one alkylated polyalkyleneamine and
  (b) at least one polyalkylene polyether polyol modified polyepoxide resin;
(ii) at least one multifunctional amine having 2 or more active amine hydrogens; and
(iii) water.

Curing agent compositions of the present invention can be produced with various reactant ratios of the modified polyepoxide resin to the alkylated polyalkyleneamine compound. It is within the scope of the present invention for the ratio of the number of stoichiometric epoxy groups in the at least one polyalkylene polyether polyol modified polyepoxide resin to the number of moles of the at least one alkylated polyalkyleneamine to be in a range from about 0.2:1 to about 1.3:1. In another aspect, the ratio is about 0.25:1, about 0.3:1, about 0.4:1, about 0.5:1, about 0.6:1, about 0.7:1, about 0.8:1, about 0.9:1, about 1:1, about 1.1:1, about 1.2:1, or about 1.25:1. Yet, in another aspect, the ratio is in a range from about 0.3:1 to about 1.25:1, or from about 0.4:1 to about 1.2:1. Alternatively, the ratio of the number of stoichiometric epoxy groups in the at least one polyalkylene polyether polyol modified polyepoxide resin to the number of moles of the at least one alkylated polyalkyleneamine is in a range from about 0.5:1 to about 1.1:1. In a further aspect, the ratio is in a range from about 0.7:1 to about 1.1:1, or from about 0.9:1 to about 1.1:1.

In accordance with the present invention, a method of making a curing agent composition is provided. This method comprises adding one of at least one polyalkylene polyether polyol modified polyepoxide resin and at least one alkylated polyalkyleneamine compound to the other, which can be done in a reactor, vessel, or other container. One component, e.g., the polyepoxide resin, is added to the other slowly, over a time period generally from about 1 to about 3 hours. The reaction temperature can be between about 50° C. and about 150° C. Reaction temperature can be maintained substantially constant during the addition process. In another aspect, the reaction temperature can be between about 70° C. and about 85° C. The reaction can cause an exotherm, raising the temperature above the set point. After the addition step is complete, the temperature can be changed. The temperature after the addition step is between about 50° C. and about 150° C. Alternatively, the temperature at this stage can be between about 100° C. and about 130° C. The reaction can be allowed to continue for approximately another 30 minutes to about 2 hours to provide for a substantially complete reaction. Non-limiting examples of the synthesis of curing agent compositions in accordance with the present invention are illustrated in Examples 14-28 that follow.

In preparing the reaction product, the curing agent composition can become very viscous, and in such cases, a solvent can be added to the reactor. Exemplary solvents include, but are not limited to, n-butanol, toluene, xylene, and the like, or mixtures thereof. The solvent can be removed via distillation after the reaction is complete, and optionally replaced with water to keep the viscosity low or to form an aqueous curing agent composition.

In another aspect of the invention, before the reaction product cools, at least one multifunctional amine is added to lower the viscosity and to target a desired AHEW for the curing agent composition. Optionally, water is added to reach a desired percent solids content for such aqueous curing agent composition.

Further, it can be beneficial for the aqueous curing agent compositions of the present invention to form single phase systems after dilution with water. For example, the present invention provides for an aqueous composition at about 20° C., wherein the curing agent composition is diluted with water to less than 40% solids to form a single phase aqueous curing agent composition. The aqueous curing agent composition is substantially free of co-solvents. Substantially free of co-solvents means that less than 1% by weight of a solvent or diluent other than water (e.g., an acid or organic solvent) is present in the aqueous curing agent formulation. Acids can be used to protonate amine groups and thereby increase the solubility of the curing agent composition in water. Additionally, these single phase waterborne compositions or formulations are substantially clear to the naked eye. In another aspect, a single phase aqueous curing agent composition can be formed under the same conditions discussed above after dilution with water to less than 20% solids. In a further aspect, a single phase aqueous composition can be formed at about 20° C., and substantially free of co-solvents, after dilution with water to less than 10% solids.

Aqueous curing agent compositions described herein can maintain single phase uniformity for extended periods of time, which can be required for storage of the product and its subsequent use in its intended application. Additionally, if these compositions are substantially free of co-solvents, they can have substantially no VOC's, which can be beneficial for environmental, health and safety issues, as will be appreciated by those skilled in the art.

The water-based curing agent compositions also can be further modified with monofunctional epoxides, such as, for example, phenylglycidylether, o-cresylglycidylethers, p-tert-butylphenylglycidylethers, n-butylglycidylethers, and other similar glycidylethers or esters. Optionally, the curing agent compositions of the present can further comprise organic acids, such as acetic acid, sulfamic acid, lactic acid, salicylic acid, and sebacic acid; or inorganic acids, such as boric acid and phosphoric acid; or combinations thereof. Addition of the acid functionality can increase the solubility of the curing agent composition in water. Further, curing agent compositions disclosed herein can be blended with other commercially available curing agents. Such commercially available curing agents include, but are not limited to, water-based curing agents, which can be employed in a blend to target specific properties, such as cure rate, drying speed, hardness development, clarity, and gloss.

The present invention, in yet another aspect, provides amine-epoxy compositions. For example, an amine-epoxy composition in accordance with the present invention comprises the reaction product of:

A) a curing agent composition comprising the contact product of:
   (i) the reaction product of:
      (a) at least one alkylated polyalkyleneamine and
      (b) at least one polyalkylene polyether polyol modified polyepoxide resin; and
   (ii) at least one multifunctional amine having 2 or more active amine hydrogens; and
B) an epoxy composition comprising at least one multifunctional epoxy resin.

Further, in another aspect of the present invention, aqueous amine-epoxy compositions comprising the amine-epoxy composition described immediately above and water are provided. These novel waterborne amine-epoxy compositions have good stability when in contact with concrete or cementitious materials and high gloss and good hardness development when in the form of a film or coating.

The present invention also includes articles of manufacture comprising an amine-epoxy composition as described above. Such articles can include, but are not limited to, an adhesive, a coating, a primer, a sealant, a curing compound, a construction product, a flooring product, or a composite product. Additional components or additives can be used together with the compositions of the present invention to produce articles of manufacture. Further, such coatings, primers, sealants, or curing compounds can be applied to metal or cementitious substrates.

The relative amount chosen for the epoxy composition versus that of the curing agent composition, or hardener, can vary depending upon, for example, the end-use article, its desired properties, and the fabrication method and conditions used to produce the end-use article. For instance, in coating applications using certain amine-epoxy compositions, incorporating more epoxy resin relative to the amount of the curing agent composition can result in coatings which have increased drying time, but with increased hardness and improved appearance as measured by gloss. Amine-epoxy compositions of the present invention generally have stoichiometric ratios of epoxy groups in the epoxy composition to amine hydrogens in the curing agent composition ranging from about 1.5:1 to about 0.7:1. For example, such amine-epoxy compositions can have stoichiometric ratios of about 1.5:1, about 1.4:1, about 1.3:1, about 1.2:1, about 1.1:1, about 1:1, about 0.9:1, about 0.8:1, or about 0.7:1. In another aspect, the stoichiometric ratio ranges from about 1.3:1 to about 0.7:1. In yet another aspect, the stoichiometric ratio ranges from about 1.2:1 to about 0.8:1. In still another aspect, the stoichiometric ratio ranges from about 1.1:1 to about 0.9:1. Non-limiting examples of waterborne amine-epoxy compositions in accordance with the present invention are illustrated in Examples 29-52 that follow.

Applicants disclose several types of ranges in the present invention. These include, but are not limited to, a range of AHEW, a range of number of carbon atoms, a range of integers, and a range of reactant ratios and stoichiometric ratios. When Applicants disclose or claim a range of any type, Applicants' intent is to disclose or claim individually each possible number that such a range could reasonably encompass, as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that "$R^1$" can be a $C_1$ to $C_{16}$ alkyl group, or in alternative language having from 1 to 16 carbon atoms, as used herein, refers to a "$R^1$" group that can be selected independently from an alkyl group having 1, 2, 3, 4, 5, 6, 7, 8, 9, 10, 11, 12, 13, 14, 15, or 16 carbon atoms, as well as any range between these two numbers (for example, a $C_6$ to $C_{13}$ alkyl group), and also including any combination of ranges between these two numbers (for example, a $C_2$ to $C_4$ and $C_6$ to $C_8$ alkyl group).

Similarly, another representative example follows for the reactant ratio of the number of stoichiometric epoxy groups in the at least one polyalkylene polyether polyol modified polyepoxide resin to the number of moles of the at least one alkylated polyalkyleneamine. By a disclosure that this ratio is in a range from about 0.2:1 to about 1.3:1, for example, Applicants intend to recite that the ratio can be selected from about 0.2:1, about 0.3:1, about 0.4:1, about 0.5:1, about 0.6:1, about 0.7:1, about 0.8:1, about 0.9:1, about 1:1, about 1.1:1, about 1.2:1, or about 1.3:1. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or formulations described herein. Combining additional materials or components can be done by any method known to one of skill in the art.

While compositions and methods are described in terms of "comprising" various components or steps, the compositions and methods can also "consist essentially of" or "consist of" the various components or steps.

Alkylated Polyalkyleneamine

Polyalkyleneamine compounds that are useful in producing the alkylated polyalkyleneamine compounds of the present invention include, but are not limited to, polyethyleneamines, polypropyleneamines, aminopropylated ethylenediamines, aminopropylated propylenediamines, and combinations thereof. Non-limiting examples of polyethyleneamines include ethylenediamine (EDA), diethylenetriamine (DETA), triethylenetetramine (TETA), teraethylenepentamine (TEPA), pentaethylenehexamine (PEHA), and other higher polyethyleneamines. Suitable polypropyleneamines include, but are not limited to, propylenediamine, dipropylenetriamine, tripropylenetetramine, and other higher polypropyleneamines. Aminopropylated ethylenediamines and aminopropylated propylenediamines include, but are not limited to, N-3-aminopropyl ethylenediamine (N3), N,N'-bis(3-aminopropyl)ethylenediamine (N4), N,N,N'-tris(3-aminopropyl)ethylenediamine (N5), N-3-aminopropyl-1,3-diaminopropane, N,N'-bis(3-aminopropyl)-1,3-diaminopropane, and N,N,N'-tris(3-aminopropyl)-1,3-diaminopropane, and the like. Mixtures of polyalkyleneamine compounds can be employed in the present invention. It will be recognized by those skilled in the art that polyethyleneamines containing 4 or more nitrogens are generally available as complex mixtures, most of which contain the same number of nitrogens. Side products in these mixtures are often called congeners. For example, TETA contains not only linear TETA, but also tris-aminoethylamine, N,N'-bis-aminoethylpiperazine, and 2-aminoethylaminoethylpiperazine.

In one aspect of the present invention, the at least one polyalkyleneamine compound is EDA, DETA, TETA, TEPA, PEHA, propylenediamine, dipropylenetriamine, tripropylenetetramine, N3, N4, N5, N-3-aminopropyl-1,3-diaminopropane, N,N'-bis(3-aminopropyl)-1,3-diaminopropane, N,N,N'-tris(3-aminopropyl)-1,3-diaminopropane, or any combination thereof. In another aspect, the at least one polyalkyleneamine compound is a mixture of DETA and TETA. Typical mixtures of DETA and TETA are 1 part by weight of DETA to about 0.1 to about 1.1 parts by weight of TETA. In this and other aspects of the present invention, the mixtures of DETA and TETA can be 1 part by weight of DETA to about 0.1, about 0.2, about 0.3, about 0.4, about 0.5, about 0.6, about 0.7, about 0.8, about 0.9, about 1.0, or about 1.1 parts by weight of TETA. For example, DETA/TETA weight ratios of 70/30 and 50/50 are useful in the present invention, as illustrated in the examples that follow. In yet another aspect, the at least one polyalkyleneamine compound is a mixture of N3, N4, and N5. Mixtures suitable for use in the present invention generally comprise 3-25 parts by weight of N3, 50-94 parts N4, and 3-25 parts N5. Such a mixture can be prepared by means known to those of skill in the art, via the reaction of EDA with acrylonitrile, followed by hydrogenation over a metal catalyst. Distillation or further separations of the resultant aminopropylated EDA mixture is generally not needed. Optionally, the low molecular weight side products of the reaction can be removed; these side products are typically more volatile than N3.

In one aspect of the present invention, the at least one alkylated polyalkyleneamine comprises the reaction product of:
(i) at least one polyalkyleneamine compound and
(ii) at least one aldehyde or ketone compound having the formula:

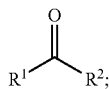

wherein:
$R^1$ is a substituted or unsubstituted $C_1$ to $C_{16}$ alkyl, alkenyl, alkadienyl, cycloalkyl, cycloalkenyl, cycloalkadienyl, aryl, or aralkyl group; $R^2$ is a hydrogen atom or a substituted or unsubstituted $C_1$ to $C_{16}$ alkyl, alkenyl, alkadienyl, cycloalkyl, cycloalkenyl, cycloalkadienyl, aryl, or aralkyl group; or $R^1$ and $R^2$ in combination form a substituted or unsubstituted $C_4$ to $C_7$ cycloalkyl, cycloalkenyl, or cycloalkadienyl group;

any substituents on $R^1$, $R^2$, and the ring structure formed by the combination of $R^1$ and $R^2$ are selected independently from =O, —OH, —OR$^3$, —R$^3$, —C(O)H, —C(O)R$^3$, —F, —Cl, —Br, or —I; and $R^3$, in each occurrence, is selected independently from a $C_1$ to $C_6$ alkyl group.

Unless otherwise specified, alkyl, alkenyl, and alkadienyl groups described herein are intended to include all structural isomers, linear or branched, of a given moiety; for example, all enantiomers and all diastereomers are included within this definition. As an example, unless otherwise specified, the term propyl is meant to include n-propyl and isopropyl, while the term butyl is meant to include n-butyl, iso-butyl, t-butyl, sec-butyl, and so forth. For instance, non-limiting examples of octyl isomers include 2-ethyl hexyl and neooctyl. Similarly, substituted alkyl, alkenyl, alkadienyl, cycloalkyl, cycloalkenyl, cycloalkadienyl, aryl, and aralkyl groups described herein are intended to include substituted analogs with substitutions at any position. For example, the substituents on alkyl, alkenyl, alkadienyl, cycloalkyl, cycloalkenyl, cycloalkadienyl, aryl, and aralkyl groups, can include, but are not limited to, at least one substituent selected independently from =O, —OH, —OR$^3$, —R$^3$, —C(O)H, —C(O)R$^3$, —F, —I, or any combination thereof, at any position on these groups that conforms to the normal rules of chemical valence. In these substituent formulas, $R^3$, in each occurrence, is selected independently from a $C_1$ to $C_6$ alkyl group.

Thus, $R^1$, $R^2$, and the ring structure formed by the combination of $R^1$ and $R^2$ can have more than one substituent. As an example, $R^1$ can be a hydrogen atom and $R^2$ can be a phenyl group with one —OH substituent and one —OR$^3$ substituent, where $R^3$ is a methyl group. In another example, $R^1$ and $R^2$ in combination form a cyclohexenyl group with a methyl substituent at one position and two methyl substituents at another position.

Non-limiting examples of alkyl groups which can be present in the at least one aldehyde or ketone compound include, but are not limited to, methyl, ethyl, propyl, butyl, pentyl, hexyl, heptyl, octyl, nonyl, or decyl, and the like. Examples of alkenyl and alkadienyl groups within the scope of the present invention include, but are not limited to, ethenyl, propenyl, butenyl, pentenyl, hexenyl, heptenyl, octenyl, nonenyl, decenyl, and the like. Cycloalkyl, cycloalkenyl, and cycloalkadienyl groups include, but are not limited to, cyclopentyl, cyclopentenyl, cyclopentadienyl, cyclohexyl, cyclohexenyl, cyclohexadienyl, and the like. Aryl groups include, for example, phenyl, alkyl-substituted phenyl, naphthyl, alkyl-substituted naphthyl, and the like. Aralkyl is defined as an aryl-substituted alkyl or arylalkyl, and aralkyl groups include, for example, phenyl-substituted alkyl, naphthyl-substituted alkyl, and the like. Hence, non-limiting examples of aryl and aralkyl groups useful in the present invention include, but are not limited to, phenyl, tolyl, benzyl, dimethylphenyl, trimethylphenyl, phenylethyl, phenylpropyl, phenylbutyl, propyl-2-phenylethyl, and the like. Unless otherwise specified, any substituted cyclic moiety used herein is meant to include all regioisomers; for example, the term tolyl is meant to include any possible substituent position, that is, ortho, meta, or para.

In another aspect of the present invention, $R^1$ is a substituted or unsubstituted $C_6$ to $C_{13}$ alkyl, alkenyl, alkadienyl, cycloalkyl, cycloalkenyl, cycloalkadienyl, aryl, or aralkyl group; $R^2$ is a hydrogen atom or a substituted or unsubstituted $C_6$ to $C_{13}$ alkyl, alkenyl, alkadienyl, cycloalkyl, cycloalkenyl, cycloalkadienyl, aryl, or aralkyl group; or $R^1$ and $R^2$ in combination form a substituted or unsubstituted $C_6$ cycloalkyl, cycloalkenyl, or cycloalkadienyl group. In this aspect, substituents on $R^1$, $R^2$, and the ring structure formed by the combination of $R^1$ and $R^2$ are selected independently from =O, —OH, —OR$^3$, or —R$^3$. In each occurrence, $R^3$ is selected independently from a $C_1$ to $C_6$ alkyl group.

In yet another aspect, $R^1$ and $R^2$, or the ring structure formed by the combination of $R^1$ and $R^2$, are selected independently from a methyl group, an ethyl group, a propyl group, a butyl group, a pentyl group, a hexyl group, an ethenyl group, a propenyl group, a butenyl group, a pentenyl group, a hexenyl group, a phenyl group, a benzyl group, a tolyl group, or a naphthyl group. In a further aspect of the present invention, $R^1$ and $R^2$ are methyl groups. Additionally, in yet another aspect, the ring structure formed by the combination of $R^1$ and $R^2$ is a benzyl group.

Aldehyde or ketone compounds useful in the present invention include, but are not limited to, acetaldehyde (also known as ethanal), propanal, butanal, pentanal, 2-ethyl hexanal, benzaldehyde, naphthaldehyde, crotonaldehyde (also known as butenal), vanillin (also known as 3-methoxy-4-hydroxybenzaldehyde), tolylaldehyde, anisaldehyde, glyoxal, acetone, methyl ethyl ketone, methyl propyl ketone, diethyl ketone, methyl butyl ketone, methyl isobutyl ketone, methyl amyl ketone, methyl hexyl ketone, cyclohexanone, methyl cyclohexanone, isophorone, acetyl acetone, methyl phenyl ketone, and the like, or any combination thereof. In a further aspect of the present invention, the at least one aldehyde or ketone compound is benzaldehyde, vanillin, glyoxal, acetone, or a combination thereof. In yet another aspect, the at least one aldehyde or ketone compound is benzaldehyde.

In accordance with the curing agent compositions and methods of making such compositions disclosed herein, the molar reactant ratio of the at least one aldehyde or ketone compound to the at least one polyalkyleneamine compound is in a range from about 0.8:1 to about 2:1. In another aspect, the molar reactant ratio is about 0.9:1, about 1:1, about 1.1:1, about 1.2:1, about 1.3:1, about 1.4:1, about 1.5:1, about 1.6:1, about 1.7:1, about 1.8:1, or about 1.9:1. In yet another aspect, the molar reactant ratio is in a range from about 0.9:1 to about 1.8:1, or from about 1:1 to about 1.6:1. In a further aspect, the molar reactant ratio of the at least one aldehyde or ketone compound to the at least one polyalkyleneamine compound is in a range from about 1.2:1 to about 1.5:1.

The alkylated polyalkyleneamines of the present invention can be prepared by the reductive amination of at least one polyalkyleneamine compound with the at least one aldehyde or ketone compounds disclosed above. Procedures for the reductive amination of aldehyde and ketone compounds are well known to those of skill in the art. Generally, these procedures involve condensing the aldehyde or ketone with the amine, then reducing the intermediate Schiff base. The reduction is typically conducted in the presence of a metal catalyst in a hydrogen-rich atmosphere at pressures above atmospheric pressure. Non-limiting examples of the synthesis of alkylated polyalkyleneamines in accordance with the present invention are illustrated in Examples 1-11 that follow.

In another aspect of the present invention, the at least one alkylated polyalkyleneamine comprises the reaction product of:
(i) at least one polyalkyleneamine compound and
(ii) at least one halogen compound having the formula:

$R^4$—X;

wherein:
X is F, Cl, Br, or I;
$R^4$ is a substituted or unsubstituted $C_1$ to $C_{16}$ alkyl, alkenyl, alkadienyl, cycloalkyl, cycloalkenyl, cycloalkadienyl, aryl, or aralkyl group;
any substituents on $R^4$ are selected independently from =O, —OH, —OR$^3$, —R$^3$, —C(O)H, —C(O)R$^3$, —F, —Cl, —Br, or —I; and
$R^3$, in each occurrence, is selected independently from a $C_1$ to $C_6$ alkyl group.

In yet another aspect, $R^4$ is a methyl group, an ethyl group, a propyl group, a butyl group, a pentyl group, a hexyl group, an ethenyl group, a propenyl group, a butenyl group, a pentenyl group, a hexenyl group, a phenyl group, a benzyl group, a tolyl group, or a naphthyl group. In still another aspect, $R^4$ is a methyl group or a benzyl group.

Halogen compounds useful in the present invention include, but are not limited to, iodomethane, bromoethane, 1-chloropropane, 1-chlorobutane, 1-chloro-2-methylpropane, benzyl chloride, 2-chloroethylbenzene, and the like, or any combination thereof. In a further aspect of the present invention, the at least one halogen compound is benzyl chloride.

As discussed above, the alkylated polyalkyleneamines of the present invention can be prepared by the reaction of at least one polyalkyleneamine compound with at least one halogen compound. A non-limiting example of the synthesis of alkylated polyalkyleneamines which can be employed in the present invention is illustrated in Publication IN166475. According to Publication IN166475, benzyl chloride (3.627 L, 31.78 moles), a halogen compound, was added in small portions to a cooled solution of anhydrous ethylenediamine (11.160 L, 167.77 moles), a polyalkyleneamine compound, in absolute ethanol. This addition occurred in a 50-L all glass lined M.S. jacketed reactor provided with an anchor type agitator, reflux condenser, a side distillation condenser, sight and light glass, thermometer pocket, outlet for gas through reflux condenser, inlet hole for charging, and bottom discharge valve. The reaction mixture was refluxed for 18 hours. Thereafter, the solution was cooled, and the excess of ethylenediamine was recovered and basified by adding sodium hydroxide. The oil separated was extracted with benzene several times, combined extracts were dried ($Na_2SO_4$) and solvent was removed. The oil obtained was distilled under reduced pressure. This exemplary synthesis of an alkylated polyalkyleneamine utilized a large molar excess of ethylenediamine. A large molar excess of one reactant is not required, but may be employed, in the practice of this invention. Generally, molar reactant ratios of the at least one halogen compound to the at least one polyalkyleneamine compound are within a range from about 0.8:1 to about 2:1. In another aspect, the molar reactant ratio is about 0.9:1, about 1:1, about 1.1:1, about 1.2:1, about 1.3:1, about 1.4:1, about 1.5:1, about 1.6:1, about 1.7:1, about 1.8:1, or about 1.9:1. Yet, in another aspect, the molar reactant ratio of the at least one halogen compound to the at least one polyalkyleneamine compound is in a range from about 1.2:1 to about 1.5:1. Additionally, those of ordinary skill in the art in the field of this invention readily recognize that other polyalkyleneamines and halogen compounds, respectively, can be substituted into this general reaction scheme under like conditions and produce additional alkylated polyalkyleneamine compounds.

In another aspect of this invention, the at least one alkylated polyalkyleneamine compound has the formula:

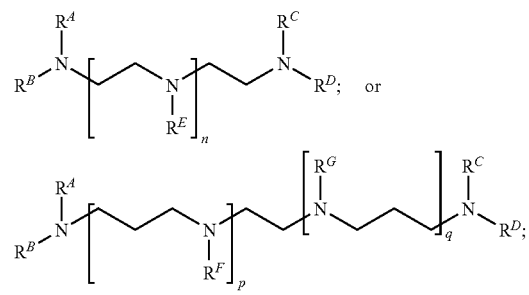

wherein:

$R^A$ is a substituted or unsubstituted $C_1$ to $C_{16}$ alkyl, alkenyl, alkadienyl, cycloalkyl, cycloalkenyl, cycloalkadienyl, aryl, or aralkyl group; any substituents on $R^A$ are selected independently from =O, —OH, —OR$^3$, —R$^3$, —C(O)H, —C(O)R$^3$, —F, —Cl, —Br, or —I; and R$^3$, in each occurrence, is selected independently from a $C_1$ to $C_6$ alkyl group;

$R^B$, $R^C$, $R^D$, $R^E$, $R^F$, and $R^G$ independently are $R^A$ or a hydrogen atom;

n is 0, 1, 2, 3, 4, 5, 6, or 7;

p is 0, 1, 2, 3, or 4; and q is 1, 2, 3, or 4.

Those of skill in the art will recognize that the backbones of these two structures are polyethyleneamines and aminopropylated ethylenediamines, respectively. For example, when n equals 2, the structure backbone is TETA. Likewise, when p and q are both equal to 1, the structure backbone is N4. As another example, when the at least one ketone or aldehyde compound is benzaldehyde or the at least one halogen compound is benzyl chloride, $R^A$ is a benzyl group. Given the many possible locations on the polyalkyleneamine compound where the benzyl group can replace a hydrogen atom, the product resulting from the reaction of at least one polyalkyleneamine compound and benzaldehyde or benzyl chloride is necessarily a mixture of many different species, where some of the $R^B$, $R^C$, $R^D$, $R^E$, $R^F$, and $R^G$ groups are hydrogen and others are benzyl groups. Which and how many of the "R" groups are converted from hydrogen to benzyl groups depends on many factors, among those being the reaction conditions, catalyst selection, reactant ratio, choice of reactant (specific halogen compound, aldehyde/ketone compound), and the like.

While not intending to be bound by this theory, Applicant's believe that one hydrogen on each terminal nitrogen on the least one polyalkyleneamine compound is preferentially replaced by the benzyl group, in this example using benzaldehyde as the aldehyde/ketone reactant. With a molar reactant ratio of benzaldehyde to the at least one polyalkyleneamine compound of between about 1:1 to about 2:1, it is believed that the major component of the reaction product is where $R^A$ is benzyl, $R^D$ is benzyl or a hydrogen atom, and $R^B$, $R^C$, $R^E$, $R^F$, and $R^G$ are hydrogen atoms.

In yet another aspect of the present invention, the at least one alkylated polyalkyleneamine compound has the formula:

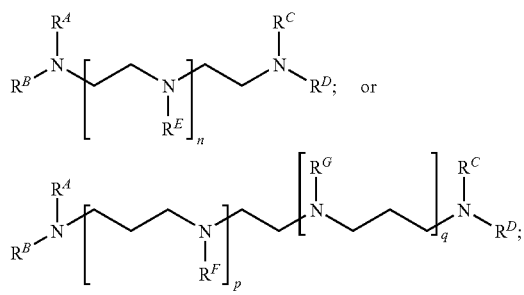

wherein:

$R^A$ is a substituted or unsubstituted $C_1$ to $C_{16}$ alkyl, alkenyl, alkadienyl, cycloalkyl, cycloalkenyl, cycloalkadienyl, aryl, or aralkyl group; any substituents on $R^A$ are selected independently from =O, —OH, —OR$^3$, —R$^3$, —C(O)H, —C(O)R$^3$, —F, —Cl, —Br, or —I; and R$^3$, in each occurrence, is selected independently from a $C_1$ to $C_6$ alkyl group;

$R^D$ is $R^A$ or a hydrogen atom;

$R^B$, $R^C$, $R^E$, $R^F$, and $R^G$ are hydrogen atoms;

n is 0, 1, 2, 3, 4, 5, 6, or 7;

p is 0, 1, 2, 3, or 4; and q is 1, 2, 3, or 4.

In a further aspect of the present invention, $R^A$ is a substituted or unsubstituted $C_6$ to $C_{13}$ alkyl, alkenyl, alkadienyl, cycloalkyl, cycloalkenyl, cycloalkadienyl, aryl, or aralkyl group. In this aspect, $R^D$ is $R^A$ or a hydrogen atom, and $R^B$, $R^C$, $R^E$, $R^F$, and $R^G$ are hydrogen atoms. Substituents on $R^A$ are selected independently from =O, —OH, —OR$^3$, and —R$^3$, wherein R$^3$, in each occurrence, is selected independently from a $C_1$ to $C_6$ alkyl group.

In another aspect, n in the above formula is 0, 1, 2, 3, or 4. Yet, in another aspect, p is 0, 1, or 2, and q is 1.

The present invention, in a different aspect, provides that $R^A$ is a methyl group, an ethyl group, a propyl group, or a benzyl group. Additionally, $R^D$ is $R^A$ or a hydrogen atom, and $R^B$, $R^C$, $R^E$, $R^F$, and $R^G$ are hydrogen atoms. In this aspect, n is 0, 1, 2, 3, or 4; p is 0, 1, or 2; and q is 1.

Polyalkylene Polyether Polyol Modified Polyepoxide

The at least one polyalkylene polyether polyol modified polyepoxide resin of the current invention comprises the reaction product of:

(i) at least one polyepoxide compound and (ii) at least one polyalkylene polyether polyol.

Suitable polyepoxide compounds and admixtures thereof are disclosed in U.S. Pat. No. 4,197,389, starting on column 4, line 12, and continuing to column 5, line 52. The disclosure of U.S. Pat. No. 4,197,389 is incorporated herein by reference in its entirety. In one aspect of the present invention, the at least one polyepoxide resin compound includes, but is not limited to, a diglycidyl ether of bisphenol A, a diglycidyl ether of bisphenol F, or a combination thereof. Generally, polyepoxide resin compounds with epoxy equivalent weights in the range from about 160 to about 500 are useful in the present invention.

Suitable polyalkylene polyether polyols are described in U.S. Pat. No. 4,197,389, starting on column 5, line 53, and continuing to column 6, line 20. Non-limiting examples of polyalkylene polyether polyols that are useful in the present invention include polyethylene glycols, polypropylene glycols, or combinations thereof. Mixtures of different molecular weight polyalkylene polyether polyols can be used, as well as mixtures of different polyalkylene polyether polyols. The combinations of the different polyether polyols can be mixed first and then reacted with the at least one polyepoxide compound, or can be reacted separately with the at least one polyepoxide compound and subsequently mixed or blended. Generally, polyalkylene polyether polyols with number average molecular weights in the range from about 200 to 10,000, from about 400 to about 8000, from about 600 to about 5000, or from about 800 to about 2500, are useful in the present invention.

At least one polyepoxide resin compound can be reacted with at least one polyalkylene polyether polyol in accordance with the process described in U.S. Pat. No. 4,197,389. Often, a Lewis acid catalyst is used to promote the reaction, such as Anchor® 1040, commercially available from Air Products and Chemicals, Inc. Anchor® 1040 is a BF$_3$-amine complex and is a well known catalyst to those of skill in the art. In addition, the reaction can be conducted in the presence of monoepoxides and solvents or softeners, as is known to those of skill in the art. Exemplary monoepoxides that can be used in admixture with the at least one polyepoxide compound include, but are not limited to, epoxidized unsaturated hydrocarbons such as butylene, cyclohexene, styrene oxide, and the like; halogen-containing epoxides such as epichlorohydrin;

epoxyethers of monohydric alcohols such as methyl, ethyl, butyl, 2-ethylhexyl, dodecyl alcohol, and the like; epoxyethers of monohydric phenols such as phenol, cresol, and other phenols substituted in the ortho or para positions; glycidyl esters of unsaturated carboxylic acids; epoxidized esters of unsaturated alcohols or unsaturated carboxylic acids; acetals of glycidaldehyde; or combination thereof. Non-limiting examples of the synthesis of polyalkylene polyether polyol modified polyepoxide resins in accordance with the present invention are illustrated in Examples 12-13 that follow.

To produce polyalkylene polyether polyol modified polyepoxide resins useful in the present invention, the reactant ratio of epoxy groups in the at least one polyepoxide compound to the hydroxyl groups in the at least one polyalkylene polyether polyol is generally within a range from about 1.5:1 to about 8:1. The reactant ratio, in accordance with another aspect of the present invention, is about 1.6:1, about 2:1, about 2.5:1, about 3:1, about 3.5:1, about 4:1, about 4.5:1, about 5:1, about 5.5:1, about 6:1, about 6.5:1, about 7:1, or about 7.5:1. In yet another aspect, the reactant ratio is in a range from about 1.8:1 to about 6:1. In a further aspect, the reactant ratio of epoxy groups in the at least one polyepoxide compound to the hydroxyl groups in the at least one polyalkylene polyether polyol is in a range from about 2:1 to about 4:1.

Multifunctional Amine

Compositions in accordance with the present invention can comprise at least one multifunctional amine. Multifunctional amine, as used herein, describes compounds with amine functionality and which contain two (2) or more active amine hydrogens.

Non-limiting examples of multifunctional amines that are within the scope of the present invention include, but are not limited to, an aliphatic amine, a cycloaliphatic amine, an aromatic amine, a Mannich base derivative of an aliphatic amine, a cycloaliphatic amine, or an aromatic amine, a polyamide derivative of an aliphatic amine, a cycloaliphatic amine, or an aromatic amine, an amidoamine derivative of an aliphatic amine, a cycloaliphatic amine, or an aromatic amine, an amine adduct derivative of an aliphatic amine, a cycloaliphatic amine, or an aromatic amine, and the like, or any combination thereof.

More than one multifunctional amine can be used in the compositions of the present invention. For example, the at least one multifunctional amine can comprise an aliphatic amine and a Mannich base derivative of a cycloaliphatic amine. Also, the at least one multifunctional amine can comprise one aliphatic amine and one different aliphatic amine.

Exemplary aliphatic amines include polyethyleneamines (EDA, DETA, TETA, TEPA, PEHA, and the like), polypropyleneamines, aminopropylated ethylenediamines (N3, N4, N5, and the like), aminopropylated propylenediamines, 1,6-hexanediamine, 3,3,5-trimethyl-1,6-hexanediamine, 3,5,5-trimethyl-1,6-hexanediamine, 2-methyl-1,5-pentanediamine (commercially available as Dytek-A), and the like, or combinations thereof. In one aspect of this invention, the at least one multifunctional amine is EDA, DETA, TETA, TEPA, PEHA, propylenediamine, dipropylenetriamine, tripropylenetetramine, N3, N4, N5, N-3-aminopropyl-1,3-diaminopropane, N,N'-bis(3-aminopropyl)-1,3-diaminopropane, N,N,N'-tris(3-aminopropyl)-1,3-diaminopropane, or any combination thereof. Additionally, the poly(alkylene oxide) diamines and triamines commercially available under the Jeffamine name from Huntsman Corporation, are useful in the present invention. Illustrative examples include, but are not limited to, Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C.-346, Jeffamine® ED-600, Jeffamine® ED-900, Jeffamine® ED-2001, and the like, or combinations thereof.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine, various isomers or norbornane diamine, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and the like, or combinations thereof. The mixture of methylene bridged poly (cyclohexyl-aromatic)amines is abbreviated as either MBPCAA or MPCA, and is described in U.S. Pat. No. 5,280,091, which is incorporated herein by reference in its entirety. In one aspect of the present invention, the at least one multifunctional amine is a mixture of methylene bridged poly(cyclohexyl-aromatic)amines (MPCA).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present invention is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol (commercially available as Ancamine® K54 from Air Products and Chemicals, Inc.) or bis-dimethylaminomethylphenol. Polyamide derivatives can be prepared by the reaction of an aliphatic amine, cycloaliphatic amine, or aromatic amine with dimer fatty acid, or mixtures of a dimer fatty acid and a fatty acid. Amidoamine derivatives can be prepared by the reaction of an aliphatic amine, cycloaliphatic amine, or aromatic amine with fatty acids. Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

In one aspect of the present invention, the at least one multifunctional amine is an at least one alkylated polyalkyleneamine, the reaction product of:
(i) at least one polyalkyleneamine compound and
(ii) at least one aldehyde or ketone compound having the formula:

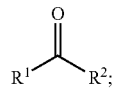

wherein:
$R^1$ is a substituted or unsubstituted $C_1$ to $C_{16}$ alkyl, alkenyl, alkadienyl, cycloalkyl, cycloalkenyl, cycloalkadienyl, aryl, or aralkyl group; $R^2$ is a hydrogen atom or a substituted or unsubstituted $C_1$ to $C_{16}$ alkyl, alkenyl, alkadienyl, cycloalkyl, cycloalkenyl, cycloalkadienyl, aryl, or aralkyl group; or $R^1$ and $R^2$ in combination form a substituted or unsubstituted $C_4$ to $C_7$ cycloalkyl, cycloalkenyl, or cycloalkadienyl group;

any substituents on $R^1$, $R^2$, and the ring structure formed by the combination of $R^1$ and $R^2$ are selected independently from =O, —OH, —$OR^3$, —$R^3$, —C(O)H, —C(O)$R^3$, —F, —Cl, —Br, or —I; and $R^3$, in each occurrence, is selected independently from a $C_1$ to $C_6$ alkyl group.

In another aspect of this invention, the at least one multifunctional amine is an at least one alkylated polyalkyleneamine compound having the formula:

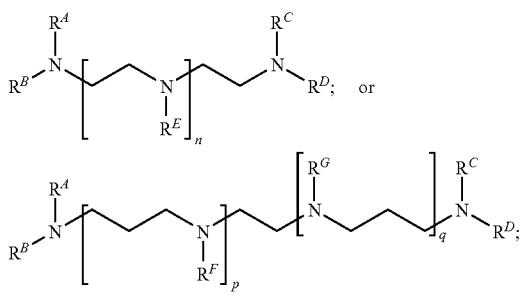

wherein:

$R^A$ is a substituted or unsubstituted $C_1$ to $C_{16}$ alkyl, alkenyl, alkadienyl, cycloalkyl, cycloalkenyl, cycloalkadienyl, aryl, or aralkyl group; any substituents on $R^A$ are selected independently from =O, —OH, —$OR^3$, —$R^3$, —C(O)H, —C(O)$R^3$, —F, —Cl, —Br, or —I; and $R^3$, in each occurrence, is selected independently from a $C_1$ to $C_6$ alkyl group;

$R^B$, $R^C$, $R^D$, $R^E$, $R^F$, and $R^G$ independently are $R^A$ or a hydrogen atom;

n is 0, 1, 2, 3, 4, 5, 6, or 7;

p is 0, 1, 2, 3, or 4; and q is 1, 2, 3, or 4.

It can be beneficial to limit the volatility of the specific multifunctional amine used in some applications where worker exposure and safety issues may arise. Thus, in another aspect of the present invention, the at least one multifunctional amine contains 6 or more carbon atoms. In another aspect, the at least one multifunctional amine contains 8 or more carbon atoms. In yet another aspect, the at least one multifunctional amine contains 12 or more carbon atoms.

Multifunctional Epoxy Resin

Amine-epoxy compositions of the present invention comprise the reaction product of a curing agent composition and an epoxy composition comprising at least one multifunctional epoxy resin. Multifunctional epoxy resin, as used herein, describes compounds containing 2 or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference.

One class of epoxy resins suitable for use in the present invention comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl)propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present invention:

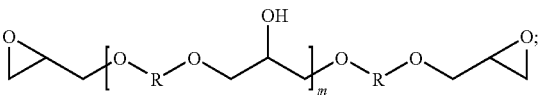

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present invention.

In another aspect, epoxy novolac resins, which are the glycidyl ethers of novolac resins, can be used as multifunctional epoxy resins in accordance with the present invention. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products ranges from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the prevent invention. In another aspect the multifunctional epoxy resin has an EEW in a range from about 170 to about 250.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

Miscellaneous Additives

Compositions of the present invention can be used to produce various articles of manufacture. Depending on the requirements during the manufacturing of or for the end-use application of the article, various additives can be employed in the formulations and compositions to tailor specific properties. These additives include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof. It is understood that other mixtures or materials that are known in the art can be included in the compositions or formulations and are within the scope of the present invention.

Articles

The present invention also is directed to articles of manufacture comprising the compositions disclosed herein. For example, an article can comprise an amine-epoxy composition which comprises the reaction product of a curing agent composition and an epoxy composition. The curing agent composition can comprise the contact product of at least one multifunctional amine having 2 or more active amine hydrogens and the reaction product of at least one alkylated polyalkyleneamine and at least one polyalkylene polyether polyol modified polyepoxide resin. The epoxy composition can comprise at least one multifunctional epoxy resin. Optionally, various additives can be present in the compositions or formulations used to produce fabricated articles, dependent upon the desired properties. These additives can include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof.

Articles in accordance with the present invention include, but are not limited to, a coating, an adhesive, a construction product, a flooring product, or a composite product. Coatings based on these amine-epoxy compositions can be solvent-free or can contain diluents, such as water or organic solvents, as needed for the particular application. Coatings can contain various types and levels of pigments for use in paint and primer applications.

Numerous substrates are suitable for the application of coatings of this invention with proper surface preparation, as is well known to one of ordinary skill in the art. Such substrates include, but are not limited to, concrete and various types of metals and alloys, such as steel and aluminum. Coatings of the present invention are suitable for the painting or coating of large metal objects or cementitious substrates including ships, bridges, industrial plants and equipment, and floors.

Coatings of this invention can be applied by any number of techniques including spray, brush, roller, paint mitt, and the like. In order to apply very high solids content or 100% solids coatings of this invention, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

Construction and flooring applications include compositions comprising the amine-epoxy compositions of the present invention in combination with concrete or other materials commonly used in the construction industry. Applications of compositions of the present invention include, but are not limited to, its use as a primer, a deep penetrating primer, a coating, a curing compound, and/or a sealant for new or old concrete, such as referenced in ASTM C309-97, which is incorporated herein by reference. As a primer, the amine-epoxy compositions of the present invention can be applied to surfaces to improve adhesive bonding prior to the application of a coating. As it pertains to concrete and cementitious application, a coating is an agent used for application on a surface to create a protective or decorative layer or a coat. As used herein, a curing compound is capable of forming a protective film on top of a concrete surface, acting as a vapor barrier to partially or completely prevent water from evaporating from the concrete, and thus enabling the concrete to hydrate properly and increase its internal strength. A sealant is capable of forming a protective film on top of a concrete, acting as a barrier to partially or completely prevent liquids from getting in and moisture evaporating from the concrete. Crack injection and crack filling products also can be prepared from the compositions disclosed herein. Amine-epoxy compositions of the present invention can be mixed with cementitious materials such as concrete mix to form polymer or modified cements, tile grouts, and the like. Non-limiting examples of composite products or articles comprising amine-epoxy compositions disclosed herein include tennis rackets, skis, bike frames, airplane wings, glass fiber reinforced composites, and other molded products.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one or ordinary skill in the art without departing from the spirit of the present invention or the scope of the appended claims.

Example 1

Synthesis of Benzylated Ethylenediamine (EDA) at a 1.1:1 Molar Ratio 180.3 g of EDA (3.0 moles) and 2.7 g of Pd/C catalyst were placed in a 1-liter autoclave batch reactor. The reactor was sealed and subsequently purged with nitrogen and then with hydrogen to remove any air from the reactor. Over a time period of about 15 to 20 minutes, 350.1 g of benzaldehyde (3.3 moles) were added to the reactor. After the addition of the benzaldehyde was complete, the reactor contents were stirred for an additional 15 minutes or until the reaction was complete, at which time the reaction exotherm began to subside. At this point, the reactor was pressurized to 120 psi with hydrogen and the reactor was heated to 80° C. When the rate of hydrogen uptake slowed, the pressure was increased to 800 psi and the temperature was increased to 120° C. The hydrogenation process continued until the rate of hydrogen uptake fell below 0.0034 MPa/min (0.5 psi/min). The total hydrogenation time was about 5 hours. The reactor was cooled to 60° C. and depressurized, and the reaction product was filtered to remove the catalyst. Water was removed using a rotary-evaporator operating under 20 mm Hg vacuum and temperatures up to 120° C. The resulting reaction product was benzylated EDA, with viscosity, AHEW, theoretical amine value, and actual (measured) amine value properties as shown in Table 1.

Example 2

Synthesis of Alkylated Diethylenetriamine (DETA) at a 1.2:1 Molar Ratio 397.2 g of DETA (3.78 moles) and 6 g of Pd/C catalyst were placed in a 1-liter autoclave batch reactor. The reactor was sealed and subsequently purged with nitrogen and then with hydrogen to remove any air from the reactor. Over a time period of about 15 to 20 minutes, 268.3 g of acetone (4.63 moles) were added to the reactor. After the addition of the acetone was complete, the reactor contents were stirred for an additional 15 minutes or until the reaction was complete, at which time the reaction exotherm began to subside. At this point, the reactor was pressurized to 120 psi with hydrogen and the reactor was heated to 80° C. When the rate of hydrogen uptake slowed, the pressure was increased to 800 psi and the temperature was increased to 120° C. The hydrogenation process continued until the rate of hydrogen uptake fell below 0.0034 MPa/min (0.5 psi/min). The total hydrogenation time was about 5 hours. The reactor was cooled to 60° C. and depressurized, and the reaction product was filtered to remove the catalyst. Water was removed using a rotary-evaporator operating under 20 mm Hg vacuum and temperatures up to 120° C. The resulting reaction product was alkylated DETA, with viscosity, AHEW, theoretical amine value, and actual (measured) amine value properties as shown in Table 1.

Examples 3-5

Synthesis of Benzylated Diethylenetriamine (DETA) at Varying Molar Ratios

Examples 3-5 utilized the same process as described in Example 1. The molar ratio of benzaldehyde to DETA was 1.2:1 for Example 3, 1.5:1 for Example 4, and 2:1 for Example 5. These reactant ratios are indicated by the degree of alkylation in Table 1. Additionally, Table 1 lists the viscosity, AHEW, theoretical amine value, and actual (measured) amine value properties of the benzylated DETA reaction products of Examples 3-5.

Example 6

Synthesis of Benzylated Triethylenetetramine (TETA) at a 1.2:1 Molar Ratio

Example 6 utilized the same process as described in Example 1, but with TETA as the polyalkyleneamine compound. The resulting viscosity, AHEW, theoretical amine value, and actual (measured) amine value properties are shown in Table 1.

Examples 7-10

Synthesis of Benzylated DETA/TETA at Varying Molar Ratios

Examples 7-10 utilized the same process as described in Example 1. As illustrated in Table 1, Examples 7, 8, and 10 used a 70/30 weight ratio of DETA/TETA as the polyalkyleneamine reactant. In these three examples, the ratio of the moles of benzaldehyde to the total moles of amine was varied in the range of 1.2:1 to 1.5:1. Example 9 used a 50/50 weight ratio of DETA/TETA, and the ratio of the moles of benzaldehyde to the total moles of amine was 1.2:1 (degree of alkylation). Table 1 lists the viscosity, AHEW, theoretical amine value, and actual (measured) amine value properties of the benzylated DETA/TETA reaction products of Examples 7-10.

Example 11

Synthesis of Benzylated N4 Mixture at a 1.2:1 Molar Ratio

Example 11 utilized the same process as described in Example 1. The N4 mixture is a composition comprising 5-8 parts of N3, 82-88 parts of N4, 5-8 parts of N5, and 1.5-4 parts of other materials. The ratio of the moles of benzaldehyde to the total moles of amine was 1.2:1. Table 1 lists the viscosity, AHEW, theoretical amine value, and actual (measured) amine value properties of the benzylated N4 mixture reaction product of Example 11.

TABLE 1

Examples 1-11 - Synthesis of Alkylated Polyalkyleneamines.

| | Example # | | | |
|---|---|---|---|---|
| | 1 | 2 | 3 | 4 |
| Amine(s) used | EDA | DETA | DETA | DETA |
| Amine ratio | 100 | 100 | 100 | 100 |
| Alkylating agent | Benzaldehyde | Acetone | Benzaldehyde | Benzaldehyde |
| Degree of alkylation | 1.1:1 | 1.2:1 | 1.2:1 | 1.5:1 |
| Amine quantity (g) | 180.3 | 397.2 | 340.6 | 309.6 |
| Alkylating agent (g) | 350.1 | 268.3 | 420.2 | 477 |
| Pd/C catalyst (g) | 2.7 | 6 | 5 | 6.2 |
| Viscosity at 25° C. (mPa · s) | 11.1 | 6 | 30.2 | 36.4 |
| AHEW | 60 | 42.6 | 51.8 | 68 |
| Theoretical Amine value (mg KOH/g) | 667 | 1067 | 797 | 707 |
| Actual Amine value (mg KOH/g) | 629 | 1056 | 776 | 697 |

TABLE 1-continued

Examples 1-11 - Synthesis of Alkylated Polyalkyleneamines.

| | Example # | | | |
|---|---|---|---|---|
| | 5 | 6 | 7 | 8 |
| Amine(s) used | DETA | TETA | DETA/TETA | DETA/TETA |
| Amine ratio | 100 | 100 | 70/30 | 70/30 |
| Alkylating agent | Benzaldehyde | Benzaldehyde | Benzaldehyde | Benzaldehyde |
| Degree of alkylation | 2:1 | 1.2:1 | 1.2:1 | 1.5:1 |
| Amine quantity (g) | 240.5 | 365 | 210/90 | 210/90 |
| Alkylating agent (g) | 495 | 322.7 | 338 | 421 |
| Pd/C catalyst (g) | 3.6 | 5.5 | 4.5 | 6 |
| Viscosity at 25° C. (mPa · s) | 49.1 | 73.2 | 40 | 47.5 |
| AHEW | 94.3 | 52.9 | 54.3 | 65 |
| Theoretical Amine value (mg KOH/g) | 595 | 883 | 830 | 712 |
| Actual amine value (mg KOH/g) | 600 | 847 | 794 | 707 |

| | Example # | | |
|---|---|---|---|
| | 9 | 10 | 11 |
| Amine(s) used | DETA/TETA | DETA/TETA | N4 mixture |
| Amine ratio | 50/50 | 70/30 | 100 |
| Alkylating agent | Benzaldehyde | Benzaldehyde | Benzaldehyde |
| Degree of alkylation | 1.2:1 | 1.3:1 | 1.2:1 |
| Amine quantity (g) | 195/195 | 1904/816 | 325 |
| Alkylating agent (g) | 406 | 3318 | 238 |
| Pd/C catalyst (g) | 6 | 41 | 5 |
| Viscosity at 25° C. (mPa · s) | 40 | 31 | 65.5 |
| AHEW | 54 | 58.2 | 61.1 |
| Theoretical Amine value (mg KOH/g) | 846 | 794 | 781 |
| Actual Amine value (mg KOH/g) | 806 | 763 | 785 |

Example 12

Synthesis of Polyalkylene Polyetherpolyol Modified Polyepoxide Resin A 379 g of polyethylene glycol 1000 (0.758 equivalents OH) and 490 g of a bisphenol-A diglycidyl ether having an epoxy equivalent weight of 190 (2.58 equivalents epoxy) were charged to a stirred reactor equipped with a thermocouple and a reflux condenser. The ratio of epoxy groups or epoxy equivalents in the polyepoxide compound to hydroxyl groups in the polyol was 3.4:1. 3 grams of a $BF_3$-amine catalyst, commercially available from Air Products and Chemicals, Inc., as Anchor® 1040, were then added to the reactor. While the reactor contents were stirred, the reactor temperature was increased to 170° C. This temperature was maintained until the epoxy equivalent weight increased to about 475 to 500. The reactor contents were then cooled, resulting in a reaction product designated as Resin A. The epoxy equivalent weight of Resin A was 498 and the viscosity at 40° C. was 33 Poise (3.3 Pa-s).

Example 13

Synthesis of Polyalkylene Polyetherpolyol Modified Polyepoxide Resin B

Example 13 utilized the same process as described in Example 12. The reactants were 3043.8 g of polyethylene glycol 2000 (3.04 equivalents OH) and 1144.6 g of a bisphenol-A diglycidyl ether having an epoxy equivalent weight of 190 (6.09 equivalents epoxy). The ratio of epoxy groups or epoxy equivalents in the polyepoxide compound to hydroxyl groups in the polyol was 2:1. After following the process of Example 12, the final product was designated as Resin B. The epoxy equivalent weight of Resin B was 1392 and the viscosity at 70° C. was 668 mPa·s. Viscosity was determined using a Brookfield DV-II+ cone and plate viscometer, CP52 spindle, 100 rpm. Using Gel Permeation Chromatography (GPC), THF solvent, and polystyrene calibration standards, the $M_n$ (number-average molecular weight) was 4017, and the $M_w$ (weight average molecular weight) was 7866. Low molecular weight unreacted epoxy resin was excluded from molecular weight distribution and from the determination of $M_n$ and $M_w$.

Examples 14-20

Preparation of Curing Agent Compositions Using a 2-Step Process

In the 2-step process, the stoichiometric amount of at least one alkylated polyalkyleneamine required to react with the at least one polyalkylene polyetherpolyol modified polyepoxide resin is charged to the reactor initially, then the epoxide resin is added to commence the reaction. Once the reaction is complete, at least one multifunctional amine (i.e., free amine) can be added to the reaction product followed by dilution of the product with water and stirring for 15 minutes to ensure consistency.

In step 1 of Example 14, 67.2 g (0.04 moles) of benzylated EDA (1.2:1 degree of benzylation) were placed in a 1-liter glass reactor fitted with a glass stirrer, a thermocouple and a 250-ml dropping funnel. The benzylated EDA was heated to 82° C. and maintained at that temperature. 200 g (0.2 moles) of Resin A (see Example 12) were pre-heated to 80° C. and charged to the dropping funnel. Resin A was then added slowly from the funnel to the benzylated amine in the reactor over about 2 hours. The reactor contents were stirred continuously at 320-360 rpm to ensure uniform dispersion of Resin A in the benzylated amine. A slight exotherm was observed that brought the temperature up to about 84° C. After the addition of Resin A was complete, the temperature was increased to 120° C. and maintained for 1 hour. The resulting product was a curing agent composition comprising the reaction product of at least one alkylated polyalkyleneamine and at least one polyalkylene polyetherpolyol modified polyepoxide resin. The reaction product had a measured amine value of 156.3 mg KOH/g and an AHEW of 371. The viscosity at 25° C. could not be accurately determined due to the semi-solid nature of the reaction product composition.

In step 2 of Example 14, 72.1 g (0.43 moles) of a multi-functional amine, benzylated EDA in this example, were added over a time period of 15 minutes to the reaction product composition of step 1. Then, 339.3 g of water were added to bring the solids content of this final product to 50%. This final product had an amine value of 136 mg KOH/g, a viscosity at 25° C. of 37500 mPa·s, and an AHEW of 353. Table 2 summarizes the quantities of each reactant and the additional components, as well as the analytical test results on the final product.

Examples 15-20 utilized the same process as described in Example 14. As illustrated in Table 2, Examples 15 and 16 utilized benzylated DETA and benzylated TETA, respectively, as the at least one alkylated polyalkyleneamine in step 1, the reaction with Resin A, and as the multifunctional amine (or free amine) in step 2. Examples 17-20 used benzylated DETA/TETA mixtures as the at least one alkylated polyalkyleneamine and as the multifunctional amine (or free amine). Example 17 used a 50/50 weight ratio of DETA/TETA and Examples 18-20 used a 70/30 weight ratio of DETA/TETA.

Comparative Example 21

Preparation of a Curing Agent Composition Using a 2-Step Process, Absent the Alkylated Polyalkyleneamine Comparative Example 21 utilized a 70/30 weight ratio of DETA/TETA as the polyalkyleneamine component, but the polyalkyleneamine component was not alkylated, i.e., not reacted with at least one halogen compound or at least one aldehyde or ketone compound, such as, for example, acetone or benzaldehyde.

Examples 22-23

Preparation of Curing Agent Compositions Using a 1-Step Process

In the 1-step process, all of the at least one alkylated polyalkyleneamine is charged to reactor. No additional multifunctional amine or free amine is subsequently added. The at least one alkylated polyalkyleneamine is reacted with the at least one polyalkylene polyetherpolyol modified polyepoxide resin. Once the reaction is complete, the reaction product can be diluted with water and stirred for 15 minutes to ensure consistency.

In Example 22, 262.3 g (1.1 moles) of benzylated DETA (1.5:1 degree of benzylation) were placed in a 2-liter glass reactor fitted with a glass stirrer, a thermocouple, connected to a control, and a 500-ml dropping funnel. The benzylated DETA was heated to 82° C. and maintained at that temperature. 300 g (0.3 moles) of Resin A (see Example 12) were pre-heated to 80° C. and charged to the dropping funnel. Resin A was then added slowly from the funnel to the benzylated amine in the reactor over about 2 hours. The reactor contents were stirred continuously at 320-360 rpm to ensure uniform dispersion of Resin A in the benzylated amine. A slight exotherm was observed that brought the temperature up to about 84° C. After the addition of Resin A was complete, the temperature was increased to 120° C. and maintained for 1 hour. The resulting product was a curing agent composition comprising the reaction product of at least one alkylated polyalkyleneamine and at least one polyalkylene polyetherpolyol modified polyepoxide resin.

This reaction product was cooled down to about 100° C., and 562.3 g of water were added to bring the solids content of the final product to 50%. This final product had an amine value of 162 mg KOH/g, a viscosity at 25° C. of 4968 mPa·s, and an AHEW of 347. Example 23 utilized the same process as described in Example 22, but the benzylated DETA had a 2:1 degree of benzylation. Table 2 summarizes Examples 22-23.

TABLE 2

Examples 14-23 - Preparation of Curing Agent Compositions.

| | Example # | | | |
|---|---|---|---|---|
| | 14 | 15 | 16 | 17 |
| Process stages | 2 steps | 2 steps | 2 steps | 2 steps |
| Adducted amine(s) | BzEDA | BzDETA | BzTETA | BzDETA/TETA |
| Degree of benzylation | 1.2:1 | 1.2:1 | 1.2:1 | 1.2:1 |
| DETA/TETA Amine ratio | | | | 50/50 |
| Amine quantity (g) | 67 | 147 | 103.2 | 92.8 |
| Resin used for adduction | Resin A | Resin A | Resin A | Resin A |
| Resin quantity (g) | 200 | 352 | 200 | 200 |
| Adduct viscosity at 25° C. (mPa·s) | solid | solid | solid | |
| AHEW | 371 | 256 | 202 | |
| Actual Amine value (mg KOH/g) | 156 | 230 | | |
| Adduct used (g) | | 390 | 303.2 | 292.8 |
| Free amine added | BzEDA | BzDETA | BzDETA | BzDETA/TETA |
| Amine quantity added (g) | 72 | 105.3 | 81.8 | 79 |
| Water quantity added (g) | 339 | 495.3 | 385 | 371.8 |
| Final Product Testing: | | | | |
| Actual Amine value (mg KOH/g) | 136 | 139 | 194.4 | 202.2 |
| AHEW | 353 | 288 | 257 | 269 |

TABLE 2-continued

Examples 14-23 - Preparation of Curing Agent Compositions.

| | | | | |
|---|---|---|---|---|
| Viscosity at 25° C. (mPa · s) | 37500 | 13250 | 6609 | 11780 |
| Appearance | clear | clear | clear | clear |

| | Example # | | | |
|---|---|---|---|---|
| | 18 | 19 | 20 | 21 |
| Process stages | 2 steps | 2 steps | 2 steps | 2 steps |
| Adducted amine(s) | BzDETA/TETA | BzDETA/TETA | BzDETA/TETA | DETA/TETA |
| Degree of benzylation | 1.2:1 | 1.2:1 | 1.5:1 | 0 |
| DETA/TETA Amine ratio | 70/30 | 70/30 | 70/30 | 70/30 |
| Amine quantity (g) | 89.2 | 214.1 | 301.3 | 100 |
| Resin used for adduction | Resin A | Resin A | Resin A | Resin A |
| Resin quantity (g) | 201.1 | 480 | 600 | 432 |
| Adduct viscosity at 25° C. (mPa · s) | | | | |
| AHEW | | | | |
| Actual Amine value (mg KOH/g) | | | | |
| Adduct used (g) | 290.3 | 694.1 | 901.3 | 432 |
| Free amine added | BzDETA/TETA | BzDETA/TETA | BzDETA/TETA | DETA/TETA |
| Amine quantity added (g) | 78.4 | 187.3 | 242.7 | 50 |
| Water quantity added (g) | 368.7 | 881.4 | 1144 | 582 |
| Final Product Testing: | | | | |
| Actual Amine value (mg KOH/g) | 181.5 | 183 | 173 | 194.9 |
| AHEW | 275 | 275 | 258 | 196 |
| Viscosity at 25° C. (mPa · s) | 15870 | 12710 | 19680 | 50000 |
| Appearance | clear | clear | clear | clear |

| | Example # | |
|---|---|---|
| | 22 | 23 |
| Process stages | 1 step | 1 step |
| Adducted amine(s) | BzDETA | BzDETA |
| Degree of benzylation | 1.5:1 | 2:1 |
| DETA/TETA Amine ratio | 100 | 100 |
| Amine quantity (g) | 262.3 | 296.5 |
| Resin used for adduction | Resin A | Resin A |
| Resin quantity (g) | 300 | 300 |
| Adduct viscosity at 25° C. (mPa · s) | | |
| AHEW | | |
| Actual Amine value (mg KOH/g) | | |
| Adduct used (g) | | |
| Free amine added | | |
| Amine quantity added (g) | | |
| Water quantity added (g) | 562.3 | 596.5 |
| Final Product Testing: | | |
| Actual Amine value (mg KOH/g) | 162.6 | 144.1 |
| AHEW | 347 | 470 |
| Viscosity at 25° C. (mPa · s) | 4968 | 25780 |
| Appearance | clear | clear |

Examples 24-28

Preparation of Curing Agent Compositions Comprising a Benzylated N4 Mixture

In Example 24, 12.64 g (0.0455 moles) of benzylated N4 mixture (1.2:1 degree of benzylation) were placed in a 100-mL glass reactor fitted with a glass stirrer, a thermocouple and a 25-ml dropping funnel. The benzylated amine mixture was heated to 82° C. and maintained at that temperature. 12.02 g (0.0043 moles) of Resin B (see Example 13) were pre-heated to 80° C. and charged to the dropping funnel. Resin B was then added slowly from the funnel to the benzylated amine in the reactor over about 25 minutes. The reactor contents were stirred continuously at 300 rpm to ensure uniform dispersion of Resin B in the benzylated amine. No exotherm was observed. 18.2 g (0.0182 moles) of Resin A (see Example 12) were pre-heated to 80° C. and charged to the dropping funnel. Resin A was then added slowly from the funnel to the reactor contents over 90 minutes. The reactor contents were stirred continuously at 300 rpm to ensure uniform dispersion of Resin A in the reaction mixture. A slight exotherm was observed that brought the temperature up to about 87-88° C. After the addition of Resin A was complete, the temperature was increased to 120° C. and maintained for 1 hour. The resulting product was a curing agent composition comprising the reaction product of at least one alkylated polyalkylene-amine and at least one polyalkylene polyetherpolyol modified polyepoxide resin.

6.32 g (0.0227 moles) of a multifunctional amine, benzylated N4 in this example, were then added over a time period of 15 minutes to the reaction product. Water was subsequently added to bring the solids content of this final product to 50%. This final product had an amine value of 149.8 mg KOH/g, a viscosity at 25° C. of 13150 mPa·s, and an AHEW of 349. Table 3 summarizes the quantities of each reactant and additional components, as well as the analytical results of the final product.

Examples 25-27 utilized the same process as described in Example 24, except as follows. Example 26 used a combination of benzylated N4 and benzylated DETA/TETA as the initial charge to the reactor, as indicated in Table 3. After the reaction with Resin B and Resin A was complete, 3.31 g (0.0119 moles) of a multifunctional amine, the benzylated N4 mixture, were then added over a time period of 15 minutes to the reaction product. Then, 2.79 g (0.012 moles) of benzylated DETA/TETA were added over a time period of 15 minutes. Water was subsequently added to bring the solids content of this final product to 50%. Example 27 also used a combination of benzylated N4 and benzylated DETA/TETA as the initial charge to the reactor, as indicated in Table 3. After the reaction with Resin B and Resin A was complete, however, only one of the two benzylated amines, benzylated N4, was added prior to the dilution with water to a solids content of 50%.

Example 28 utilized the same process as described in Example 14 and is summarized in Table 3. After Resin A was added to the benzylated N4 mixture, a slight exotherm was observed that brought the temperature from 80° C. up to about 82-83° C.

product of at least one alkylated polyalkyleneamine (benzylated DETA) and at least one polyalkylene polyetherpolyol modified polyepoxide resin (Resin A) which was diluted to 50% solids. The curing agents and their respective quantities shown in examples 29-39 were used after dilution to 50% solids. Comparative Examples 37-39 used commercially available amine-based curing agent compositions. An attempt was made to produce a waterborne amine-epoxy composition using the non-alkylated DETA/TETA curing agent composition of comparative Example 21. While this material produced a formulation that was soluble in water, it could not emulsify the epoxy resin.

Drying times for the compositions are summarized in Table 5. The drying time was determined at 23° C. and 65% relative humidity (RH) using a Beck-Koller recorder, in accordance with ASTM D5895, phase 3. The procedure involved coating glass panels with the amine-epoxy compositions at approximately 6 mils wet film thickness at the time intervals indicated in the Table 5. The selection of a coating composition with either a long or short drying time depends upon the requirements of the end-use application. Generally, the results in Table 5 indicated that the coatings of inventive Examples 29-36 dry faster as they progress into the pot-life. Some of these examples had drying times in excess of 6 hours at the 10-minute time period but had drying times of less than 2 hours at the 240-minute time period.

Tables 6A, 6B, and 6C list the Persoz Hardness test results after 1 day, 3 days, and 7 days, respectively, at 23° C. and 50%

TABLE 3

Examples 24-28 - Preparation of Curing Agent Compositions.

| | Example # | | | | |
|---|---|---|---|---|---|
| | 24 | 25 | 26 | 27 | 28 |
| Process stages | 2 steps | 2 steps | 2 steps | 2 steps | 2 steps |
| 1st adducted amine(s) used | Bz N4 mixture | BzDETA/TETA | Bz N4 mixture | Bz N4 mixture | Bz N4 mixture |
| Degree of benzylation | 1.2:1 | 1.2:1 | 1.2:1 | 1.2:1 | 1.2:1 |
| 2nd adducted amine(s) used | | | BzDETA/TETA | BzDETA/TETA | |
| Degree of benzylation | 1.2:1 | | 1.2:1 | 1.2:1 | |
| DETA/TETA Amine ratio | | 70/30 | 70/30 | 70/30 | |
| Amine quantity (g) - 1st/2nd | 12.64 | 12.59 | 6.62/5.55 | 6.46/5.42 | 123.5 |
| Resin 1 used | Resin A | Resin A | Resin A | Resin A | Resin A |
| Resin 1 quantity (g) | 18.2 | 19.4 | 18.97 | 18.81 | 223.5 |
| Resin 2 used | Resin B | Resin B | Resin B | Resin B | |
| Resin 2 quantity (g) | 12.02 | 12.59 | 12.59 | 12.3 | |
| 1st Free amine added | Bz N4 mixture | Bz N4 mixture | Bz N4 mixture | Bz N4 mixture | Bz N4 mixture |
| Degree of benzylation | 1.2:1 | 1.2:1 | 1.2:1 | 1.2:1 | 1.2:1 |
| 2nd Free Amine added | | | BzDETA/TETA | | |
| Degree of benzylation | | | 1.2:1 | | |
| Amine quantity added (g) - 1st/2nd | 6.32 | 6.62 | 3.31/2.79 | 6.46 | 61.5 |
| Water quantity added (g) | 49.18 | 51.2 | 49.83 | 49.45 | 408.5 |
| Final Product Testing: | | | | | |
| Actual Amine value (mg KOH/g) | 149.8 | 131.9 | 140 | 144 | 179 |
| AHEW | 349 | 387 | 373 | 367 | 304 |
| Viscosity at 25° C. (mPa · s) | 13150 | 28900 | 23200 | 19210 | 15540 |
| Appearance | Clear | clear | clear | clear | clear |

Examples 29-39

Coatings Prepared from Waterborne Amine-Epoxy Compositions

Table 4 summarizes the waterborne amine-epoxy compositions at 40% solids used in Examples 29-39. For instance, the composition of Example 29 was 35.7 g of water, 19 g of Epikote 828 epoxy resin, and 28.8 g of the curing agent composition of Example 15. As indicated in Table 2, Example 15 was a curing agent composition comprising the reaction RH. Coatings were applied to glass panels at a wet film thickness of about 8 mils and tested in accordance with ISO 1522. Pot life was determined at 23° C. and 65% RH by coating glass panels at regular intervals of time using a 10-mil square applicator. The end of the pot-life, as indicated by "END" in the tables, was taken as the time at which there was a reduction in the film or coating gloss. As shown in Table 6A, each of the formulations of inventive Examples 29-36 had a much longer pot-life than the formulations of comparative Examples 38-39, some as long as 6 hours or more.

Additionally, the coatings of inventive Examples 29-36 had much faster hardness development than the coating of comparative Example 37. The coatings of inventive Examples 29-35 also provided higher ultimate hardness than the coatings of either comparative Example 37 or 38. Tables 6B and 6C illustrate a beneficial combination of properties provided by coatings of the present invention, that is, generally long pot-life and stable and consistent hardness over the pot-life of the amine-epoxy composition or formulation.

Tables 7A, 7B, and 7C list the 20° Gloss test results after 1 day, 3 days, and 7 days, respectively, at 23° C. and 50% RH. Results shown are the average of 10 measurements. Coatings were applied to glass panels at a wet film thickness of about 8 mils and tested in accordance with ASTM D523. The gloss was measured at an angle of 20° using a Gardner gloss meter. Measurements were made with the glass panel placed on a black cardboard background. As shown in Table 7A, each of the formulations of inventive Examples 29-36 had a much longer pot-life than the formulations of comparative Examples 38-39. In addition, the coatings of inventive Examples 29-36 generally had higher gloss than the coating of Example 39 and comparable to that of Example 38. In comparison to the coating of Example 37, coatings of inventive Examples 29-36 had significantly higher gloss results.

Tables 7B and 7C illustrate the stability over time of the high gloss levels of the coatings of inventive Examples 29-36.

Table 8 summarizes the forward and reverse impact test results for 8-mil wet film coatings at 23° C. and 50% RH. The forward and reverse impact results are shown in kg-cm and were determined using the falling ball method for rapid deformation in accordance with ASTM D2794-93. Higher impact test results generally correlate with improved flexibility and resilience of the coating. As illustrated in Table 8, the coatings of inventive Examples 29-36 generally have higher forward and reverse impact results than the coatings of Examples 37-39. In some cases, such as Examples 31, 34, and 36, the impact results are significantly better than coatings made from formulations using commercially available curing agents. Thus, the coatings of Examples 31, 34, and 36 would be expected to have superior flexibility to those of the Examples 37-39. Further, the coating of Example 36 not only provides very high impact results, but also impact results that are consistent and do not decrease over time.

Examples 32 and 33 illustrate the reproducibility of producing amine-epoxy compositions and the resultant drying time, hardness, gloss, and flexibility properties (refer to Tables 2 and 4-8). The amine curing agent used in both Example 32 and Example 33 comprised benzylated DETA/TETA with a 70/30 ratio of DETA/TETA.

TABLE 4

Examples 29-39 - Waterborne Amine-Epoxy Compositions.

| | Example # | | | | | | | | | | |
|---|---|---|---|---|---|---|---|---|---|---|---|
| | 29 | 30 | 31 | 32 | 33 | 34 | 35 | 36 | 37 | 38 | 39 |
| Curing agent used | Ex. 15 | Ex. 16 | Ex. 17 | Ex. 18 | Ex. 19 | Ex. 20 | Ex. 22 | Ex. 23 | Aq100 | Aq701 | Aq401 |
| Curing agent quantity (g) | 28.8 | 25.7 | 26.9 | 27.5 | 27.5 | 25.8 | 34.7 | 47.0 | 35.0 | 30.0 | 20 |
| Epikote 828 (g) | 19.0 | 19.0 | 19.0 | 19.0 | 19.0 | 19.0 | 19.0 | 19.0 | 19.0 | 19.0 | 19 |
| Water (g) added to reach 40% solids | 35.7 | 34.9 | 35.2 | 35.4 | 35.4 | 35.0 | 37.2 | 40.3 | 41.6 | 39.8 | 43.5 |

TABLE 5

Examples 29-39 - Drying Times.

| Time (min) | Example # | | | | | | | | | | |
|---|---|---|---|---|---|---|---|---|---|---|---|
| | 29 | 30 | 31 | 32 | 33 | 34 | 35 | 36 | 37 | 38 | 39 |
| 10 | 390 | 360 | 360 | 390 | 360 | 525 | 480 | 885 | 260 | 250 | 220 |
| 30 | 285 | 315 | 295 | 330 | 300 | 355 | 450 | 795 | 230 | 170 | 135 |
| 60 | 240 | 270 | 135 | 240 | 180 | 275 | 450 | 600 | | 160 | |
| 90 | 165 | 70 | 180 | 210 | 210 | 160 | 195 | 600 | 95 | 120 | |
| 120 | 135 | 60 | 170 | 210 | 165 | 135 | 150 | 126 | 95 | | |
| 150 | 120 | 105 | 180 | 120 | 150 | 90 | 105 | 450 | | | |
| 210 | 120 | 105 | 1 | 45 | 90 | 60 | 60 | 336 | 110 | | |
| 240 | 40 | 105 | 1 | 45 | 45 | 10 | 30 | 240 | 110 | | |

TABLE 6A

Examples 29-39 - Persoz Hardness after 1 day.

| Time (min) | Example # | | | | | | | | | | |
|---|---|---|---|---|---|---|---|---|---|---|---|
| | 29 | 30 | 31 | 32 | 33 | 34 | 35 | 36 | 37 | 38 | 39 |
| 10 | 177 | 190 | 209 | 270 | 221 | 213 | x | 173 | 58 | 104 | 245 |
| 30 | 178 | 220 | 237 | 167 | 209 | 217 | 208 | 148 | 50 | 114 | 247 |

TABLE 6A-continued

Examples 29-39 - Persoz Hardness after 1 day.

| Time (min) | 29 | 30 | 31 | 32 | 33 | 34 | 35 | 36 | 37 | 38 | 39 |
|---|---|---|---|---|---|---|---|---|---|---|---|
| 60  | 235 | 199 | 237 | 193   | 231 | 218 | 202 | 119 | 154 | 134 | 245 |
| 90  | 201 | 227 | 278 | 186.5 | 227 | 209 | 212 | 179 | 64  | 125 | END |
| 120 | 240 | 220 | 254 | 208   | 264 | 220 | 207 | 136 | 131 | END |     |
| 150 | 225 | 263 | 261 | 231   | 236 | 224 | 198 | 213 | 32  |     |     |
| 180 | 256 | 303 | 249 | 224.5 | 209 | 235 | 211 | 195 | 161 |     |     |
| 240 | 191 | 298 | 242 | 238   | 172 | 217 | END | 143 | 246 |     |     |
| 300 | 209 | 237 | 201 | 224.5 | 188 | 201 |     | 154 | 183 |     |     |
| 360 | 263 | 315 | 255 | 223   | END | END |     | 191 | 185 |     |     |
| 420 | END | END | END | 237.5 |     |     |     | 173 | 187 |     |     |
| 480 |     |     |     | x     |     |     |     |     |     |     |     |

TABLE 6B

Examples 29-39 - Persoz Hardness after 3 days.

| Time (min) | 29 | 30 | 31 | 32 | 33 | 34 | 35 | 36 | 37 | 38 | 39 |
|---|---|---|---|---|---|---|---|---|---|---|---|
| 10  | 284 | 329 | 283 | 269 | 313 | 299 | x   | 223 | 109   | 214 | 304 |
| 30  | 269 | 326 | 289 | 243 | 298 | 304 | 282 | 249 | 123   | 218 | 319 |
| 60  | 307 | 323 | 307 | 244 | 321 | 292 | 281 | 193 | 210   | 215 | 327 |
| 90  | 287 | 339 | 315 | 255 | 298 | 299 | 288 | 230 | 113   | 216 |     |
| 120 | 316 | 338 | 325 | 276 | 305 | 315 | 286 | 203 | 144   |     |     |
| 150 | 264 | 345 | 308 | 274 | 302 | 319 | 279 | 186 | 31    |     |     |
| 180 | 261 | 336 | 297 | 290 | 293 | 321 | 266 | 190 | 151   |     |     |
| 240 | 243 | 301 | 258 | 283 | 241 | 298 | END | 175 | 307   |     |     |
| 300 | 228 | 301 | 239 | 273 | 292 | 296 |     | 180 | 196   |     |     |
| 360 | 214 | 302 | 311 | 263 | END | END |     | 185 | 220.5 |     |     |
| 420 | END | END | x   | 289 |     |     |     | 198 | 190   |     |     |
| 480 |     |     | END | x   |     |     |     |     |       |     |     |

TABLE 6C

Examples 29-39 - Persoz Hardness after 7 days.

| Time (min) | 29 | 30 | 31 | 32 | 33 | 34 | 35 | 36 | 37 | 38 | 39 |
|---|---|---|---|---|---|---|---|---|---|---|---|
| 10  | 320 | 324 | 328 | 329 | 355 | 340 | x   | 228 | 136 | 315 | 349 |
| 30  | 321 | 324 | 333 | 354 | 318 | 346 | 328 | 296 | 137 | 334 | 339 |
| 60  | 351 | 323 | 351 | 302 | 348 | 334 | 324 | 222 | 231 | 339 | 267 |
| 90  | 348 | 330 | 353 | 344 | 334 | 338 | 327 | 245 | 72  | 329 |     |
| 120 | 346 | 305 | 333 | 317 | 358 | 346 | 325 | 245 | 159 |     |     |
| 150 | 291 | 317 | 320 | 350 | 334 | 353 | 313 | 297 | 121 |     |     |
| 180 | 348 | 337 | 320 | 313 | 311 | 341 | 303 | 224 | 182 |     |     |
| 240 | 251 | 327 | 257 | 321 | 299 | 334 | END | 221 | 306 |     |     |
| 300 | 282 | 340 | 242 | 309 | 322 | 321 |     | 225 | 243 |     |     |
| 360 | 338 | 322 | 326 | 301 | END | END |     | 232 | 238 |     |     |
| 420 | END | END | x   | 320 |     |     |     | 210 | 251 |     |     |
| 480 |     |     | END | x   |     |     |     |     |     |     |     |

TABLE 7A

Examples 29-39 - Gloss after 1 day.

| Time (min) | 29 | 30 | 31 | 32 | 33 | 34 | 35 | 36 | 37 | 38 | 39 |
|---|---|---|---|---|---|---|---|---|---|---|---|
| 10 | 172 | 174 | 170 | 176 | 172 | 175 | x | 169 | 35 | 166.5 | 121 |
| 30 | 174 | 169 | 176 | 172 | 182 | 177 | 145 | 170 | 77 | 163 | 137 |
| 60 | 172 | 174 | 176 | 164 | 181 | 182 | 171 | 181 | 46 | 159 | 144 |
| 90 | 179 | 156 | 175 | 172 | 181 | 181 | 168 | 176 | 38 | 150.5 | |
| 120 | 178 | 164 | 180 | 162 | 175 | 176 | 157 | 169 | 37 | | |
| 150 | 169 | 172 | 175 | 173 | 181 | 182 | 101 | 170 | 43 | | |
| 180 | 173 | 176 | 174 | 168 | 175 | 177 | 43 | 176 | 29 | | |
| 240 | 170 | 166 | 174 | 167 | 179 | 181 | END | 170 | 59 | | |
| 300 | 160 | 159 | 176 | 152 | 170 | 179 | | 174 | 35 | | |
| 360 | 156 | 152 | 167 | 137 | END | END | | 173 | 37 | | |
| 420 | END | END | x | 87 | | | | 170 | 30 | | |
| 480 | | | END | x | | | | | | | |

TABLE 7B

Examples 29-39 - Gloss after 3 days.

| Time (min) | 29 | 30 | 31 | 32 | 33 | 34 | 35 | 36 | 37 | 38 | 39 |
|---|---|---|---|---|---|---|---|---|---|---|---|
| 10 | 169 | 174 | 162 | 176 | 183 | 180 | x | 171 | 36 | 167 | 114 |
| 30 | 176 | 169 | 176 | 172 | 181 | 182 | 146 | 158 | 121 | 163 | 128 |
| 60 | 173 | 175 | 177 | 165 | 181 | 182 | 171 | 181 | 22 | 157 | 141 |
| 90 | 179 | 165 | 177 | 171 | 175 | 177 | 170 | 177 | 24 | 148 | |
| 120 | 180 | 169 | 181 | 164 | 181 | 183 | 161 | 170 | 41 | | |
| 150 | 171 | 170 | 176 | 177 | 176 | 177 | 104 | 172 | 43 | | |
| 180 | 172 | 175 | 175 | 170 | 181 | 182 | 45 | 177 | 35 | | |
| 240 | 170 | 168 | 175 | 166 | 170 | 180 | END | 171 | 41 | | |
| 300 | 160 | 161 | 177 | 154 | END | END | | 174 | 17 | | |
| 360 | 155 | 153 | 177 | 140 | | | | 174 | 31 | | |
| 420 | END | END | 180 | 110 | | | | 170 | 29 | | |
| 480 | | | END | X | | | | | | | |

TABLE 7C

Examples 29-39 - Gloss after 7 days.

| Time (min) | 29 | 30 | 31 | 32 | 33 | 34 | 35 | 36 | 37 | 38 | 39 |
|---|---|---|---|---|---|---|---|---|---|---|---|
| 10 | 170 | 172 | 174 | 176 | 176 | 175 | x | 171 | 37 | 166 | 119 |
| 30 | 175 | 154 | 177 | 172 | 183 | 182 | 148 | 173 | 129 | 161 | 130 |
| 60 | 172 | 175 | 177 | 172 | 181 | 182 | 170 | 178 | 41 | 155 | 140 |
| 90 | 178 | 170 | 175 | 173 | 182 | 183 | 171 | 178 | 78 | 147 | |
| 120 | 180 | 171 | 181 | 165 | 177 | 178 | 161 | 173 | 39 | | |
| 150 | 171 | 171 | 176 | 177 | 182 | 183 | 95 | 173 | 43 | | |
| 180 | 174 | 178 | 175 | 170 | 177 | 178 | 50 | 179 | 32 | | |
| 240 | 171 | 172 | 175 | 124 | 181 | 182 | END | 172 | 43 | | |
| 300 | 160 | 161 | 175 | 153 | 171 | 180 | | 176 | 22 | | |
| 360 | 156 | 154 | 167 | 140 | END | END | | 175 | 28 | | |
| 420 | END | END | x | 111 | | | | 172 | 27 | | |
| 480 | | | END | x | | | | | | | |

TABLE 8

Examples 29-39 - Forward and Reverse Impact.

| | Example # | | | | | | | | | | |
|---|---|---|---|---|---|---|---|---|---|---|---|
| | 29 | 30 | 31 | 32 | 33 | 34 | 35 | 36 | 37 | 38 | 39 |
| Forward Impact | | | | | | | | | | | |
| 7 days | 52 | 17 | 135 | 80 | 80 | 139 | 104 | 139 | 35 | 17 | 17 |
| 1 month | 69 | 35 | 87 | 87 | 80 | 118 | 69 | 139 | 35 | 17 | 17 |
| 3 months | 69 | 35 | 87 | 83 | 69 | 90 | 69 | 139 | | | |
| 6 months | 52 | 28 | 80 | 52 | 69 | 87 | 62 | 139 | 17 | 17 | 17 |
| Reverse Impact | | | | | | | | | | | |
| 7 days | 14 | 3.5 | 52 | 59 | 59 | 139 | 17 | 139 | <2 | 3.5 | 3.5 |
| 1 month | 17 | 3.5 | 10.4 | 48.5 | 21 | 87 | 17 | 160 | <3.5 | 3.5 | 3.5 |
| 3 months | 17 | 3.5 | 17 | 17 | 17 | 17 | 17 | 139 | | | |
| 6 months | 3.5 | 3.5 | 17 | 17 | 17 | 17 | 17 | 139 | <3.5 | 3.5 | 3.5 |

Examples 40-44

Coatings Prepared from Waterborne Amine-Epoxy Compositions wherein the Amine Component Comprises a Benzylated N4 Mixture Table 9 summarizes the waterborne amine-epoxy compositions at 40% solids used in Examples 40-44. For instance, the composition of Example 40 was 40.8 g of water, 20.8 g of Epikote 828 epoxy resin, and 38.4 g of the curing agent composition of Example 24. As indicated in Table 3, Example 24 was a curing agent composition comprising the reaction product of at least one alkylated polyalkyleneamine (benzylated N4) and at least one polyalkylene polyetherpolyol modified polyepoxide resin (Resin A and Resin B) which was diluted to 50% solids. The curing agents and their respective quantities shown in examples 40-44 were used after dilution to 50% solids.

The viscosity measurements in Table 10 were taken at 25° C. and measured in mPa·s. These results indicate that these amine-epoxy formulations having an amine component that comprises or is based on Benzylated N4 have a short pot-life.

Drying times, Persoz hardness, and gloss were determined in the manner described above in reference to Examples 29-39. The results in Table 11 for inventive Examples 40-44 show generally faster coating drying times, in comparison to the coatings of inventive Examples 29-36 in Table 5.

Table 12 lists the Persoz Hardness test results after 1 day, 3 days, and 7 days. The coatings of Examples 40-43 had slower hardness development, and lower ultimate hardness, than the coatings of Examples 29-36, referring to Tables 6A, 6B, and 6C. As shown in Table 12, the coating of Example 44 had high ultimate hardness and stable and consistent hardness, similar to that exemplified in Examples 29-35.

Table 13 lists the 20° Gloss test results after 1 day, 3 days, and 7 days. As shown in Table 13, each of the coatings of inventive Examples 40-44 generally had higher gloss than the coatings of Examples 37 and 39, and comparable gloss to the coatings of inventive Examples 29-36 and comparative Example 38. The gloss data for Examples 29-39 is shown in Tables 7A, 7B, and 7C.

TABLE 9

Examples 40-44 - Waterborne Amine-Epoxy compositions.

| | Example # | | | | |
|---|---|---|---|---|---|
| | 40 | 41 | 42 | 43 | 44 |
| Curing agent used | Ex. 24 | Ex. 25 | Ex. 26 | Ex. 27 | Ex. 28 |
| Curing agent quantity (g) | 38.4 | 40.3 | 39.8 | 39.3 | 35.6 |
| Epikote 828 (g) | 20.8 | 19.8 | 20.1 | 20.3 | 22.2 |
| Water (g) to 40% solids | 40.8 | 39.8 | 40.1 | 40.3 | 42.2 |

TABLE 10

Examples 40-44 - Formulation Viscosity in mPa · s.

| | Example # | | | | |
|---|---|---|---|---|---|
| Time (min) | 40 | 41 | 42 | 43 | 44 |
| 0 | 2503 | 1761 | 2240 | 1500 | 14250 |
| 5 | 1978 | 1582 | 1654 | 1190 | 18370 |
| 10 | 1940 | 1519 | 1692 | 1453 | |
| 15 | 2020 | 1574 | 1917 | 1678 | |
| 20 | 2282 | 1714 | 2170 | 1936 | |
| 25 | 2578 | 2214 | 2484 | 2311 | |
| 30 | 2981 | 2597 | 2948 | 3727 | |
| 35 | 3473 | 3015 | 3553 | 3093 | |
| 40 | 3937 | 3660 | 4284 | | |
| 45 | 4518 | | | | |
| 60 | | | | | |

TABLE 11

Examples 40-44 - Drying times.

| | Example # | | | | |
|---|---|---|---|---|---|
| Time (min) | 40 | 41 | 42 | 43 | 44 |
| 10 | 330 | 390 | 285 | X | 165 |
| 30 | 250 | 270 | 240 | 375 | 240 |
| 60 | 130 | 180 | 165 | 285 | |
| 90 | | 60 | 120 | 240 | |
| 120 | | 60 | | | |

TABLE 12

Examples 40-44 - Persoz Hardness after 1 day, 3 days, and 7 days.

| Time (min) | Example # | | | | |
|---|---|---|---|---|---|
| | 40 | 41 | 42 | 43 | 44 |
| 1 DAY | | | | | |
| 10 | 99 | 78 | 94 | 60 | 247 |
| 30 | 94 | 94 | 88 | 65 | 245 |
| 60 | 99 | 87 | 99 | 72 | 210 |
| 90 | | | | 84 | |
| 3 DAYS | | | | | |
| 10 | 155 | 126 | 149 | 99 | 310 |
| 30 | 138 | 139 | 130 | 105 | 302 |
| 60 | 133 | 130 | 138 | 111 | 269 |
| 90 | | | | 118 | |
| 7 DAYS | | | | | |
| 10 | 210 | 174 | 193 | 133 | 332 |
| 30 | 204 | 195 | 180 | 130 | 335 |
| 60 | 211 | 172 | 188 | 148 | 313 |
| 90 | | | | 159 | |

TABLE 13

Examples 40-44 - Gloss after 1 day, 3 days, and 7 days.

| Time (min) | Example # | | | | |
|---|---|---|---|---|---|
| | 40 | 41 | 42 | 43 | 44 |
| 1 DAY | | | | | |
| 10 | 174 | 171 | 179 | 174 | 179 |
| 30 | 176 | 178 | 177 | 173 | 174 |
| 60 | 163 | 144 | 163 | 180 | 163 |
| 90 | | | | 154 | |
| 3 DAYS | | | | | |
| 10 | 171 | 175 | 170 | 174 | 180 |
| 30 | 175 | 175 | 178 | 173 | 174 |
| 60 | 152 | 164 | 145 | 180 | 163 |
| 90 | | 164 | | | |
| 7 DAYS | | | | | |
| 10 | 163 | 171 | 167 | 172 | 175 |
| 30 | 175 | 176 | 177 | 173 | 172 |
| 60 | 155 | 166 | 144 | 179 | 165 |
| 90 | | | | 150 | |

Examples 45-52

Cement Stability Testing of Waterborne Amine-Epoxy Compositions

Table 14 summarizes the waterborne amine-epoxy compositions at 10% solids used in Examples 45-52. For instance, the composition of Example 45 was 85.2 g of water, 5.2 g of Epikote 828 epoxy resin, and 9.6 g of the curing agent composition of Example 14. As indicated in Table 2, Example 14 was a curing agent composition comprising the reaction product of at least one alkylated polyalkyleneamine (benzylated EDA) and at least one polyalkylene polyetherpolyol modified polyepoxide resin (Resin A) which was diluted to 50% solids.

Cement stability testing was conducted by mixing the amine-based curing agent, epoxy resin, and water to achieve 10% solids, as indicated in Table 14. To 50 g of the diluted amine-epoxy composition, at 10% solids, 1 g of Portland cement was added and mixed thoroughly. Many commercially available amine-epoxy emulsions do not remain stable upon addition of the cement and the increase in alkalinity, and tend to curdle. Table 14 shows that each of the amine-epoxy compositions, or emulsions, of inventive Examples 45-52 continued to exhibit a stable emulsion after addition of the cement. Repeat tests were conducted with the compositions of Examples 46-47 with the same stable results.

TABLE 14

Examples 45-52 - Cement Stability Testing.

| | Example # | | | | | | | |
|---|---|---|---|---|---|---|---|---|
| | 45 | 46 | 47 | 48 | 49 | 50 | 51 | 52 |
| Curing agent used | Ex. 14 | Ex. 15 | Ex. 16 | Ex. 17 | Ex. 18 | Ex. 20 | Ex. 22 | Ex. 23 |
| AHEW (100% solids) | 176.5 | 144 | 138.5 | 134.5 | 137.5 | 129 | 173.5 | 235 |
| AHEW (50% solids) | 353 | 288 | 257 | 269 | 275 | 258 | 347 | 470 |
| Curing agent quantity (g) at 50% solids | 9.6 | 8.6 | 7.8 | 8.3 | 8.4 | 8.1 | 9.5 | 11.1 |
| Epikote 828 (g) | 5.2 | 5.7 | 5.8 | 5.9 | 5.8 | 6.0 | 5.2 | 4.5 |
| Water (g) to 10% solids | 85.2 | 85.7 | 86.4 | 85.9 | 85.8 | 86.0 | 85.2 | 84.5 |
| Cement stability test | Stable | Stable | Stable | Stable | Stable | Stable | Stable | Stable |
| Repeat test | | Stable | Stable | | | | | |

The invention claimed is:

1. A composition comprising the contact product of:
   (i) the reaction product of:
      (a) at least one amine and
      (b) at least one polyalkylene polyether polyol modified polyepoxide resin; and
   (ii) at least one multifunctional amine having more than 2 active amine hydrogens; wherein the composition has an amine hydrogen equivalent weight based on 100% solids from about 50 to about 500 and wherein the at least one amine (a) has the formula:

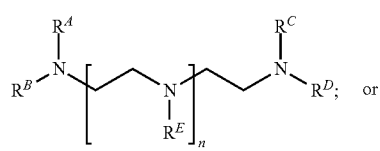

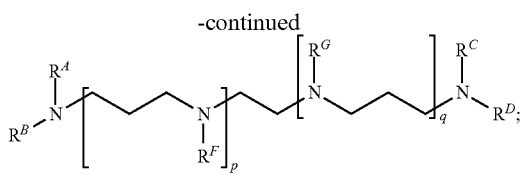

wherein $R^A$ is a substituted or unsubstituted $C_1$ to $C_{16}$ alkyl, alkenyl, alkadienyl, cycloalkyl, cycloalkenyl, cycloalkadienyl, aryl, or aralkyl group;

wherein any substituents on $R^A$ are selected independently from =O, —OH, —OR$^3$, —R$^3$, —C(O)H, —C(O)R$^3$, —F, —Cl, —Br, or —I;

wherein $R^3$, in each occurrence, is selected independently from a $C_1$ to $C_6$ alkyl group;

wherein $R^D$ is $R^A$ or a hydrogen atom;

wherein $R^B$, $R^C$, $R^E$, $R^F$, and $R^G$ are hydrogen atoms;

wherein n is 0, 1, 2, 3, 4, 5, 6, or 7;

wherein p is 0, 1, 2, 3, or 4; and wherein q is 1, 2, 3, or 4.

2. The composition of claim 1, wherein the at least one amine (a) comprises the hydrogenated reaction product of:
(a1) at least one polyalkyleneamine compound and
(a2) at least one aldehyde or ketone compound.

3. The composition of claim 2, wherein the at least one aldehyde or ketone compound is acetaldehyde, propanal, butanal, pentanal, 2-ethyl hexanal, benzaldehyde, naphthaldehyde, crotonaldehyde, vanillin, tolylaldehyde, anisaldehyde, glyoxal, acetone, methyl ethyl ketone, methyl propyl ketone, diethyl ketone, methyl butyl ketone, methyl isobutyl ketone, methyl amyl ketone, methyl hexyl ketone, cyclohexanone, methyl cyclohexanone, isophorone, acetyl acetone, methyl phenyl ketone, or any combination thereof.

4. The composition of claim 2, wherein the at least one aldehyde or ketone compound is benzaldehyde, vanillin, glyoxal, acetone, or any combination thereof.

5. The composition of claim 2, wherein the at least one polyalkyleneamine compound is ethylenediamine (EDA), diethylenetriamine (DETA), triethylenetetramine (TETA), teraethylenepentamine (TEPA), pentaethylenehexamine (PEHA), N-3-aminopropyl ethylenediamine (N3), N,N'-bis(3-aminopropyl) ethylenediamine (N4), or any combination thereof.

6. The composition of claim 5 wherein the at least one polyalkyleneamine compound comprises DETA.

7. The composition of claim 5 wherein the at least one polyalkyleneamine compound comprises TETA.

8. The composition of claim 2, wherein the at least one polyalkyleneamine compound is a mixture of diethylenetriamine (DETA) and triethylenetetramine (TETA) or a mixture of N-3-aminopropyl ethylenediamine (N3) and N,N'-bis(3-aminopropyl) ethylenediamine (N4).

9. The composition of claim 2, wherein the molar reactant ratio of the at least one aldehyde or ketone compound to the at least one polyalkyleneamine compound is in a range from about 0.8:1 to about 2:1.

10. The composition of claim 2 wherein the at least one aldehyde or ketone compound having the formula:

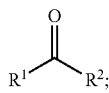

wherein $R^1$ is a substituted or unsubstituted $C_1$ to $C_{16}$ alkyl, alkenyl, alkadienyl, cycloalkyl, cycloalkenyl, cycloalkadienyl, aryl, or aralkyl group; $R^2$ is a hydrogen atom or a substituted or unsubstituted $C_1$ to $C_{16}$ alkyl, alkenyl, alkadienyl, cycloalkyl, cycloalkenyl, cycloalkadienyl, aryl, or aralkyl group; or $R^1$ and $R^2$ in combination form a substituted or unsubstituted $C_4$ to $C_7$ cycloalkyl, cycloalkenyl, or cycloalkadienyl group;

wherein any substituents on $R^1$, $R^2$, and the ring structure formed by the combination of $R^1$ and $R^2$ are selected independently from =O, —OH, —OR$^3$, —C(O)H, —C(O)R$^3$, Cl, —Br, or —I; and wherein $R^3$, in each occurrence, is selected independently from a $C_1$ to $C_6$ alkyl group.

11. The composition of claim 1, wherein $R^A$ is a methyl group, an ethyl group, a propyl group, or a benzyl group;
wherein n is 0, 1, 2, 3, or 4; and
wherein q is 1.

12. The composition of claim 1, wherein the at least one polyalkylene polyether polyol modified polyepoxide resin comprises the reaction product of:
(b1) at least one polyepoxide compound and
(b2) at least one polyalkylene polyether polyol.

13. The composition of claim 12, wherein the at least one polyepoxide compound is a diglycidyl ether of bisphenol A, a diglycidyl ether of bisphenol F, or a combination thereof.

14. The composition of claim 12, wherein the at least one polyalkylene polyether polyol is a polyethylene glycol, a polypropylene glycol, or a combination thereof.

15. The composition of claim 1, wherein the ratio of the number of stoichiometric epoxy groups in the at least one polyalkylene polyether polyol modified polyepoxide resin (b) to the number of moles of the at least one amine (a) is in a range from about 0.2:1 to about 1.3:1.

16. The composition of claim 1, wherein the at least multifunctional amine is an aliphatic amine, a cycloaliphatic amine an aromatic amine, a Mannich base derrivative of an aliphatic amine, a cycloaliphatic amine, or an aromatic amine, a polyamide derrivative of an aliphatic amine, a cycloaliphatic amine, or an aromatic amine, an amidoamine derivative of an aliphatic amine, a cycloaliphatic amine, or an aromatic amine, an amine adduct derivative of an aliphatic amine, a cycloaliphatic amine, or an aromatic amine, or any combination thereof.

17. The composition of claim 1, wherein the at least one multifunctional amine is ethylenediamine (EDA), diethylenetriamine (DETA), triethylenetetramine (TETA), teraethylenepentamine (TEPA), pentaethylenehexamine (PEHA), propylenediamine, dipropylenetriamine, tripropylenetetramine, N-3-aminopropyl ethylenediamine (N3), N,N'-bis(3-aminopropyl) ethylenediamine (N4), N,N,N'-tris(3-aminopropyl) ethylenediamine (N5); N-3-aminopropyl-1,3-diaminopropane, N,N'-bis(3-aminopropyl)-1,3-diaminopropane, N,N,N'-tris(3-aminopropyl)-1, 3-diaminopropane, or any combination thereof.

18. An aqueous curing agent composition comprising:
water and the contact product of:
(i) the reaction product of:
(a) at least one alkylated polyalkyleneamine and
(b) at least one polyalkylene polyether polyol modified polyepoxide resin; and
(ii) at least one multifunctional amine having 2 or more active amine hydrogens;
wherein the contact product and water form a single phase, and the ratio of the number of stoichometric epoxy groups in the at least one polyalkylene polyether poly modified polyepoxide resin to the number of moles of the at least one alkylated polyalkyleneamine ranges from about 0.2:1 to about 1.3:1.

19. The composition of claim 18, wherein the at least one multifunctional amine comprises at least one amine having the formula:

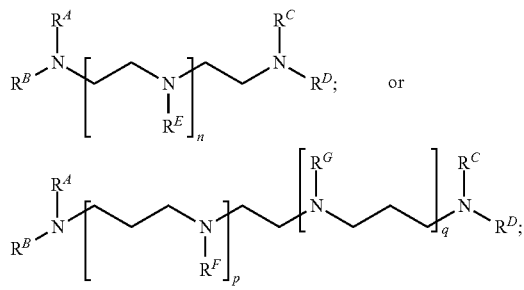

wherein $R^A$ is a substituted or unsubstituted $C_1$ to $C_{16}$ alkyl, alkenyl, alkadienyl, cycloalkyl, cycloalkenyl, cycloalkadienyl, aryl, or aralkyl group;

wherein any substituents on $R^A$ are selected independently from =O, —OH, —$OR^3$, —$R^3$, —C(O)H, —C(O)$R^3$, —F, —Cl, —Br, or —I;

wherein $R^3$, in each occurrence, is selected independently from a $C_1$ to $C_6$ alkyl group;

wherein $R^D$ is $R^A$ or a hydrogen atom;

wherein $R^B$, $R^C$, $R^E$, $R^F$, and $R^G$ are hydrogen atoms;

wherein n is 0, 1, 2, 3, 4, 5, 6, or 7;

wherein p is 0, 1, 2, 3, or 4; and wherein q is 1, 2, 3, or 4.

20. The aqueous curing agent composition of claim 18, wherein the curing agent composition is diluted with water to less than 40% solids to form a single phase at a temperature of 20° C., wherein the aqueous curing agent composition is substantially free of co-solvents.

21. A composition comprising the contact product of:
(i) the reaction product of:
   (a) at least one alkylated polvalkyleneamine and
   (b) at least one polvalkylene polyether polyol modified polyepoxide resin; and
(ii) at least one multifunctional amine having more than 2 active amine hydrogens;
wherein the epoxy curing agent composition has an amine hydrogen equivalent weight based on 100% solids from about 50 to about 500 and wherein the composition has an amine hydrogen equivalent weight (AHEW) based on 100% solids from about 100 to about 200.

22. A composition comprising:
(i) the reaction product of:
   (a) at least one amine and
   (b) at least one polyalkylene polyether polyol modified polyepoxide resin; and
(ii) at least one multifunctional amine having more than 2 active amine hydrogens and wherein the multifunctional amine contains 6 or more carbon atoms and wherein the at least one amine (a) has the formula:

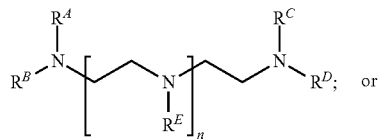

-continued

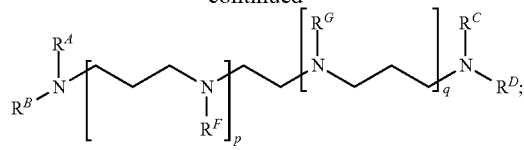

wherein $R^A$ is a substituted or unsubstituted $C_1$ to $C_{16}$ alkyl, alkenyl, alkadienyl, cycloalkyl, cycloalkenyl, cycloalkadienyl, aryl, or aralkyl group;

wherein any substituents on $R^A$ are selected independently from =O, —OH, —$OR^3$, —$R^3$, —C(O)H, —C(O)$R^3$, —F, —Cl, —Br, or —I;

wherein $R^3$, in each occurrence, is selected independently from a $C_1$ to $C_6$ alkyl group;

wherein $R^D$ is $R^A$ or a hydrogen atom;

wherein $R^B$, $R^C$, $R^E$, $R^F$, and $R^G$ are hydrogen atoms;

wherein n is 0, 1, 2, 3, 4, 5, 6, or 7;

wherein p is 0, 1, 2, 3, or 4; and wherein q is 1, 2, 3, or 4.

23. The composition of claim 22, wherein the at least one amine (a) comprises the reaction product of:
(a1) at least one polyalkyleneamine compound and
(a2) at least one aldehyde or ketone compound having the formula:

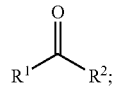

wherein $R^1$ is a substituted or unsubstituted $C_1$ to $C_{16}$ alkyl, alkenyl, alkadienyl, cycloalkyl, cycloalkenyl, or cycloalkadienyl, aryl, or aralkyl group; $R^2$ is a hydrogen atom or a substituted or unsubstituted $C_1$ to $C_{16}$ alkyl, alkenyl, alkadienyl, cycloalkyl, cycloalkenyl, cycloalkadienyl, aryl, or aralkyl group; or $R^1$ and $R^2$ in combination form a substituted or unsubstituted $C_4$ to $C_7$ cycloalkyl, cycloalkenyl, or cycloalkadienyl group;

wherein any substituents on $R^1$, $R^2$, and the ring structure formed by the combination of $R^1$ and $R^2$ are selected independently from =O,—OH, —$OR^3$,—$R^3$, —C(O)H, —C(O)$R^3$, —F, —Cl, —Br, or —I; and wherein $R^3$, in each occurrence, is selected independently from a $C_1$ to $C_6$ alkyl group.

24. The composition of claim 22, wherein the at least one polyalkylene polyether polyol modified polyepoxide resin comprises the reaction product of:
(b1) at least one polyepoxide compound and
(b2) at least one polyalkylene polyether polyol.

25. A composition comprising the contact product of:
(i) the reaction product of:
   (a) at least one amine and
   (b) at least one polyalkylene polyether polyol modified polyepoxide resin; and
(ii) at least one multifunctional amine having 2 or more active amine hydrogens;
wherein the at least one amine (a) comprises the reaction product of:
(a1) at least one polyalkyleneamine compound and
(a2) at least one aldehyde or ketone compound having the formula:

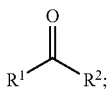

wherein R¹ is a substituted or unsubstituted $C_1$ to $C_{16}$ alkyl, alkenyl, alkadienyl, cycloalkyl, cycloalkenyl, cycloalkadienyl, aryl, or aralkyl group; R² is a hydrogen atom or a substituted or unsubstituted $C_1$ to $C_{16}$ alkyl, alkenyl, alkadienyl, cycloalkyl, cycloalkenyl, cycloalkadienyl, aryl, or aralkyl group; or R¹ and R² in combination form a substituted or unsubstituted $C_4$ to $C_7$ cycloalkyl, cycloalkenyl, or cycloalkadienyl group;

wherein any substituents on R¹, R², and the ring structure formed by the combination of R¹ and R² are selected independently from =O, —OH, —OR³, —R³, —C(O)H, —C(O)R³, —F, —Cl, —Br, or —I; and wherein R³, in each occurrence, is selected independently from a $C_1$ to $C_6$ alkyl group; and, wherein the at least one polyalkyleneamine compound comprises ethylenediamine (EDA), diethylenetriamine (DETA), triethylenetetramine (TETA), teraethylenepentamine (TEPA), pentaethylenehexamine (PEHA), propylenediamine, dipropylenetriamine, tripropylenetetramine, N-3-aminopropyl ethylenediamine (N3), N,N'-bis(3-aminopropyl) ethylenediamine (N4), N,N, N'-tris(3-aminopropyl) ethylenediamine (N5); N-3-aminopropyl-1,3-diaminopropane, N,N'-bis(3-aminopropyl)-1,3-diaminopropane, N,N,N'-tris(3-aminopropyl)-1,3-diaminopropane, or any combination thereof.

26. The composition of claim 25, wherein the at least one amine has the formula:

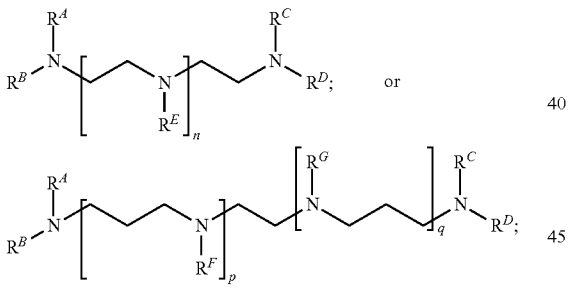

wherein $R^A$ is a substituted or unsubstituted $C_1$ to $C_{16}$ alkyl, alkenyl, alkadienyl, cycloalkyl, cycloalkenyl, cycloalkadienyl, aryl, or aralkyl group;

wherein any substituents on $R^A$ are selected independently from =O, —OH, —OR³, —R³, —C(O)H, —C(O)R³, —F, —Cl, —Br, or —I;

wherein R³, in each occurrence, is selected independently from a $C_1$ to $C_6$ alkyl group;

wherein $R^D$ is $R^A$ or a hydrogen atom;

wherein $R^B$, $R^C$, $R^E$, $R^F$, and $R^G$ are hydrogen atoms;

wherein n is 0, 1, 2, 3, 4, 5, 6, or 7;

wherein p is 0, 1, 2, 3, or 4; and wherein q is 1, 2, 3, or 4.

27. A curing composition comprising the contact product of:
(i) the reaction product of:
(a) at least one amine and
(b) at least one polyalkylene polyether polyol modified polyepoxide resin; and
(ii) at least one multifunctional amine having 2 or more active amine hydrogens;
wherein the at least one amine (a) has the formula:

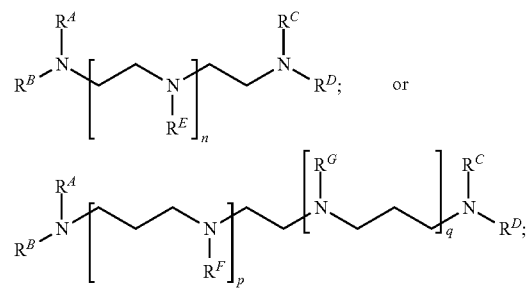

wherein $R^A$ is a substituted or unsubstituted $C_1$ to $C_{16}$ alkyl, alkenyl, alkadienyl, cycloalkyl, cycloalkenyl, cycloalkadienyl, aryl, or aralkyl group;

wherein any substituents on $R^A$ are selected independently from =O, —OH, —OR³, —R³, —C(O)H, —C(O)R³, —F, —Cl, —Br, or —I;

wherein R³, in each occurrence, is selected independently from a $C_1$ to $C_6$ alkyl group;

wherein $R^D$ is $R^A$ or a hydrogen atom;

wherein $R^B$, $R^C$, $R^E$, $R^F$, and $R^G$ are hydrogen atoms;

wherein n is 0, 1, 2, 3, 4, 5, 6, or 7;

wherein p is 0, 1, 2, 3, or 4; and wherein q is 1, 2, 3, or 4.

28. An epoxy curing agent composition comprising the contact product of:
(i) the reaction product of:
(a) at least one alkylated polyalkyleneamine and
(b) at least one polyalkylene polyether polyol modified polyepoxide resin; and
(ii) at least one multifunctional amine having 2 or more active amine hydrogens; wherein the epoxy curing agent composition has an amine hydrogen equivalent weight based on 100% solids from about 50 to about 500 and wherein the ratio of the number of stoichiometric epoxy groups in the at least one polyalkylene polyether polyol modified polyepoxide resin to the number of moles of the at least one alkylated polyalkyleneamine is in a range from about 0.2:1 to about 1.3:1.

29. A composition comprising:
(i) the reaction product of:
(a) at least one amine and
(b) at least one polyalkylene polyether polyol modified polyepoxide resin; and
(ii) at least one multifunctional amine having 2 or more active amine hydrogens and wherein the multifunctional amine contains 6 or more carbon atoms; and wherein the at least one amine (a) has the formula:

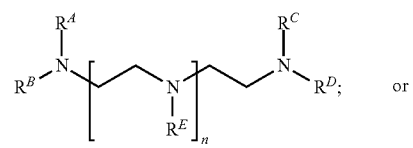

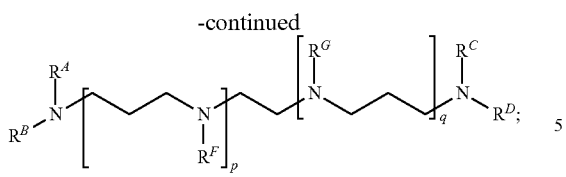

wherein $R^A$ is a substituted or unsubstituted $C_1$ to $C_{16}$ alkyl, alkenyl, alkadienyl, cycloalkyl, cycloalkenyl, cycloalkadienyl, aryl, or aralkyl group;

wherein any substituents on $R^A$ are selected independently from =O, —OH, —OR$^3$, —R$^3$, —C(O)H, —C(O)R$^3$, —F, —Cl, —Br, or —I;

wherein $R^3$, in each occurrence, is selected independently from a $C_1$ to $C_6$ alkyl group;

wherein $R^D$ is $R^A$ or a hydrogen atom;

wherein $R^B$, $R^C$, $R^E$, $R^F$, and $R^G$ are hydrogen atoms;

wherein n is 0, 1, 2, 3, 4, 5, 6, or 7;

wherein p is 0, 1, 2, 3, or 4; and wherein q is 1, 2, 3, or 4.

30. A composition comprising the contact product of:
(i) the reaction product of:
(a) at least one alkylated polyalkyleneamine and
(b) at least one polyalkylene polyether polyol modified polyepoxide resin; and
(ii) at least one multifunctional amine having more than 2 active amine hydrogens; wherein the at least one alkylated polyalkyleneamine comprises the hydrogenated reaction product of:
(a1) at least one polyalkyleneamine compound and
(a2) at least one aldehyde or ketone compound;
wherein the at least one polyalkyleneamine compound comprises at least one member selected from the group consisting of ethylenediamine (EDA), diethylenetriamine (DETA), triethylenetetramine (TETA), teraethylenepentamine (TEPA), pentaethylenehexamine (PEHA), propylenediamine, dipropylenetriamine, tripropylenetetramine, N-3-aminopropyl ethylenediamine (N3), N,N'- bis(3-aminopropyl) ethylenediamine (N4), N,N,N'-tris(3-aminopropyl) ethylenediamine (N5); N-3-aminopropyl-1,3-diaminopropane, N,N'-bis (3-aminopropyl)-1,3-diaminopropane, N,N,N'- tris(3-aminopropyl)-1,3-diaminopropane, or any combination thereof.

31. An amine-epoxy composition comprising the reaction product of:
A) a curing agent composition comprising the contact product of:
(i) the reaction product of:
(a) at least one alkylated polyalkyleneamine and
(b) at least one polyalkylene polyether polyol modified polyepoxide resin; and
(ii) at least one multifunctional amine having 2 or more active amine hydrogens; and
B) an epoxy composition comprising at least one multifunctional epoxy resin.

32. An aqueous amine-epoxy composition comprising water and the contact product of:
A) a curing agent composition comprising the contact product of:
(i) the reaction product of:
(a) at least one alkylated polyalkyleneamine and
(b) at least one polyalkylene polyether polyol modified polyepoxide resin; and
(ii) at least one multifunctional amine having 2 or more active amine hydrogens; and
B) an epoxy composition comprising at least one multifunctional epoxy resin.

* * * * *

UNITED STATES PATENT AND TRADEMARK OFFICE
CERTIFICATE OF CORRECTION

PATENT NO. : 8,143,331 B2
APPLICATION NO. : 11/672298
DATED : March 27, 2012
INVENTOR(S) : Williams Rene Edouard et al.

It is certified that error appears in the above-identified patent and that said Letters Patent is hereby corrected as shown below:

In the Claims
Column 42, Line 11

In Claim 10 insert -- $-R^3$, after $-OR^3$, --

Column 42, Line 37

In Claim 16 delete "amine an aromatic amine, a Mannich base derrivative" and insert
-- amine, an aromatic amine, a Mannich base derivative --

Column 42, Line 39

In Claim 16 delete "derrivative" and insert -- derivative --

Column 43, Line 41

In Claim 21 delete "polvalkyleneamine" and insert -- polyalkyleneamine --

Column 43, Line 42

In Claim 21 delete "polvalkylene" and insert -- polyalkylene --

Column 43, Line 43

In Claim 21 delete "polvepoxide" and insert -- polyepoxide --

Column 45, Line 62

In Claim 27 delete "curing"

Signed and Sealed this
Thirtieth Day of April, 2013

Teresa Stanek Rea
*Acting Director of the United States Patent and Trademark Office*